US 011111885B2

(12) United States Patent
Dudar

(10) Patent No.: US 11,111,885 B2
(45) Date of Patent: Sep. 7, 2021

(54) SYSTEMS AND METHODS FOR PURGING A FUEL VAPOR CANISTER IN DUAL-PATH PURGE SYSTEMS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 281 days.

(21) Appl. No.: 16/436,787

(22) Filed: Jun. 10, 2019

(65) Prior Publication Data
US 2020/0386193 A1 Dec. 10, 2020

(51) Int. Cl.
*F02M 25/08* (2006.01)
*F02D 13/02* (2006.01)
*F02D 41/00* (2006.01)
*F02B 37/18* (2006.01)

(52) U.S. Cl.
CPC .......... *F02M 25/089* (2013.01); *F02B 37/18* (2013.01); *F02D 13/0203* (2013.01); *F02D 41/0007* (2013.01); *F02D 41/0032* (2013.01); *F02D 41/0042* (2013.01); *F02D 2200/501* (2013.01); *F02D 2200/701* (2013.01)

(58) Field of Classification Search
CPC .............. F02M 25/089; F02M 25/0872; F02D 41/0042; F02D 41/0032; F02D 41/0007; F02D 13/0203; F02D 13/0223; F02D 2200/501; F02D 2200/701; F02D 2200/0406; F02D 2250/41; F02B 37/18
See application file for complete search history.

(56) References Cited

U.S. PATENT DOCUMENTS

| | | | |
|---|---|---|---|
| 2015/0292421 A1* | 10/2015 | Pursifull | F02D 41/004 123/518 |
| 2016/0290285 A1 | 10/2016 | Dudar et al. | |
| 2018/0156162 A1* | 6/2018 | Dudar | F02D 41/0045 |
| 2018/0274493 A1* | 9/2018 | Tawa | F02M 35/10222 |
| 2020/0291879 A1* | 9/2020 | Dudar | F02D 41/0032 |

OTHER PUBLICATIONS

Dudar, A., "Systems and Methods for Improving Vehicle Engine Stability," U.S. Appl. No. 16/418,894, filed May 21, 2019, 109 pages.
Dudar, A., "Systems and Methods for Improving Vehicle Engine Stability," U.S. Appl. No. 16/418,916, filed May 21, 2019, 107 pages.

* cited by examiner

*Primary Examiner* — George C Jin
(74) *Attorney, Agent, or Firm* — Geoffrey Brumbaugh; McCoy Russell LLP

(57) ABSTRACT

Methods and systems are provided for improving fuel vapor storage canister purging operations for vehicles with dual-path purge systems. In one example, a method may include purging fuel vapors from a fuel vapor storage canister to an engine of a vehicle via a single path, and in response to an unmetered increase in a concentration of the fuel vapors being purged to the engine via the single path, switching the fuel vapors to be purged to the engine via two paths simultaneously. In this way, fuel vapors may be distributed in time along the two paths, which may lower an effective concentration of fuel vapors entering the engine and may thereby avoid degradation of engine operating conditions.

20 Claims, 9 Drawing Sheets

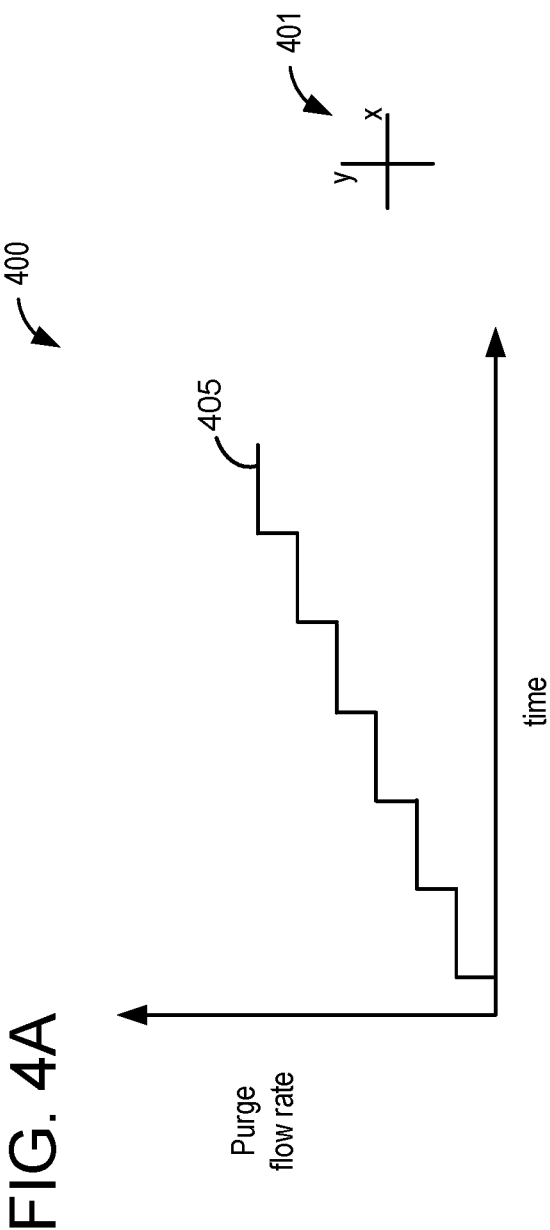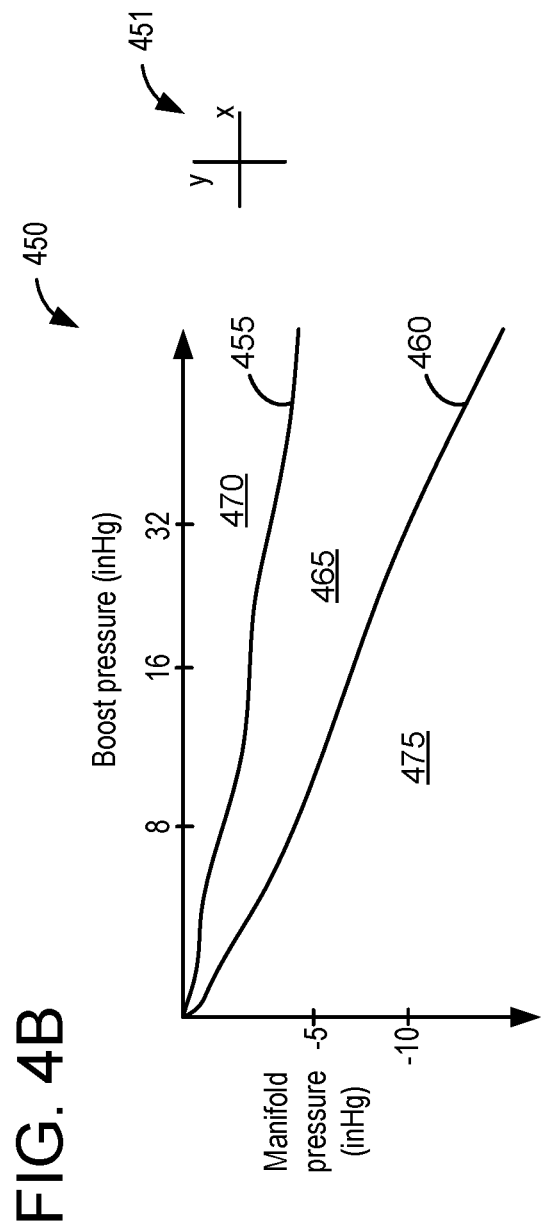
FIG. 4A
FIG. 4B

SYSTEMS AND METHODS FOR PURGING A FUEL VAPOR CANISTER IN DUAL-PATH PURGE SYSTEMS

FIELD

The present description relates generally to methods and systems for avoiding degradation of engine operating conditions and improving purging efficiency for canister purging events in dual-path purge systems.

BACKGROUND/SUMMARY

Vehicles may be fitted with evaporative emission control systems such as onboard fuel vapor recovery systems. Such systems capture and prevent release of vaporized hydrocarbons to the atmosphere, for example fuel vapors generated in a vehicle gasoline tank during refueling. Specifically, the vaporized hydrocarbons (HCs) are stored in a fuel vapor canister packed with an adsorbent which adsorbs and stores the vapors. At a later time, when the engine is in operation, the evaporative emission control system allows the vapors to be purged into the engine intake manifold for use as fuel. In some examples, the fuel vapor recovery system may include one more check valves, ejectors, and/or controller actuatable valves for facilitating purge of stored vapors under boosted or non-boosted engine operation.

Purging a fuel vapor canister can include commanding open a canister purge valve to direct an engine intake manifold vacuum at the canister, thereby drawing fresh air across the canister. The fresh air displaces stored fuel vapors from the canister which are then routed to an engine intake for combustion. To regulate an amount of fuel vapors being inducted to the engine, so as to avoid engine hesitation and/or stall, a duty cycle of the canister purge valve may be ramped up or increased over time as a function of a learned concentration of fuel vapors being inducted into the engine. However, even when such strategy is employed, certain circumstances can result in an undesirable amount of fuel vapors being inducted into the engine which may increase opportunity for engine hesitation and/or stall. For example, a sudden increase in fuel vapor generation in a fuel tank may result in an unexpected increase in fuel vapors being inducted into the engine. Such an increase may occur, as an example, under circumstances where fuel stored in the fuel tank is hot (e.g., when solar loading on the vehicle is high) and vehicle motion results in fuel slosh in the fuel tank. In response to an indication of such an undesirable amount of fuel vapors being inducted into the engine during a canister purging event, engine control strategy may in one example discontinue the purging operation to reduce the chance of engine stall. However, in response to discontinuing a purging operation prior to cleaning the canister of stored fuel vapors, the purging process, including the ramping of the duty cycle of the canister purge valve, may have to be re-started all over again. Such action may decrease purging efficiency and may lead to increased release of undesired evaporative emissions under circumstances where the canister is not effectively cleaned. Furthermore, finding opportunities to purge the canister can be challenging for hybrid electric vehicles with limited engine run time and/or in vehicles that seek to minimize engine vacuum.

The inventors herein have recognized the above-mentioned issues and have developed systems and methods to at least partially address them. In one example, a method comprises purging fuel vapors from a fuel vapor storage canister to an engine of a vehicle via a single path, and in response to an inferred increase in a concentration of the fuel vapors being purged to the engine via the single path, switching the fuel vapors to be purged to the engine via two paths simultaneously. In this way, fuel vapors being routed to the engine may be distributed along the two paths, which may decrease an effective concentration of fuel vapors entering the engine at any particular time. This serves to reduce or avoid degradation of engine operating conditions which may otherwise occur if the purging were not switched to the two paths.

As an example, the single path may include a vacuum path or a boost path, and the two paths may include both the vacuum path and the boost path. A time frame between the fuel vapors exiting the fuel vapor storage canister and entering the engine may be greater along the boost path than along the vacuum path. By distributing the fuel vapors along the two paths so as to reduce or avoid degradation of engine operating conditions, purging of the fuel vapor canister may be allowed to continue without the purging being aborted, which may reduce release of undesired evaporative emissions to atmosphere and improve canister lifetime. In addition, the canister may be more thoroughly cleaned in the limited purge time available in a hybrid vehicle.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4A depicts an example purge flow rate as a function of time for a canister purging event.

FIG. 4B depicts purge flow path as a function of boost pressure and intake manifold pressure.

DETAILED DESCRIPTION

The following description relates to systems and methods for improving canister purging operations. The systems and methods discussed herein apply to vehicle systems that are capable of purging a fuel vapor storage canister under boost conditions and/or intake manifold vacuum conditions (otherwise referred to as natural aspiration conditions), such as the vehicle system depicted at FIG. 1. Purging under boost conditions may be referred to herein as purging via a boost path, whereas purging under natural aspiration conditions may be referred to as purging via a vacuum path. Discussed herein, if while fuel vapors are being purged from the canister to engine intake via one of the boost path or the vacuum path and a sudden unmetered increase in fuel vapor concentration being inducted to engine intake is inferred, the purging may be switched to a dual-path that includes purging fuel vapors to engine intake via both the boost path and the vacuum path simultaneously. Due to a time difference between when fuel vapors exit the canister and enter the engine for the boost path as compared to the vacuum path, purging fuel vapors via the dual-path may distribute fuel vapors in time, thus reducing an effective concentration of fuel vapors received at the engine at any one time. Such action may thus allow for a reduction or avoidance of engine hesitation and/or stall issues due to the sudden increase in fuel vapor concentration.

Figure 2:
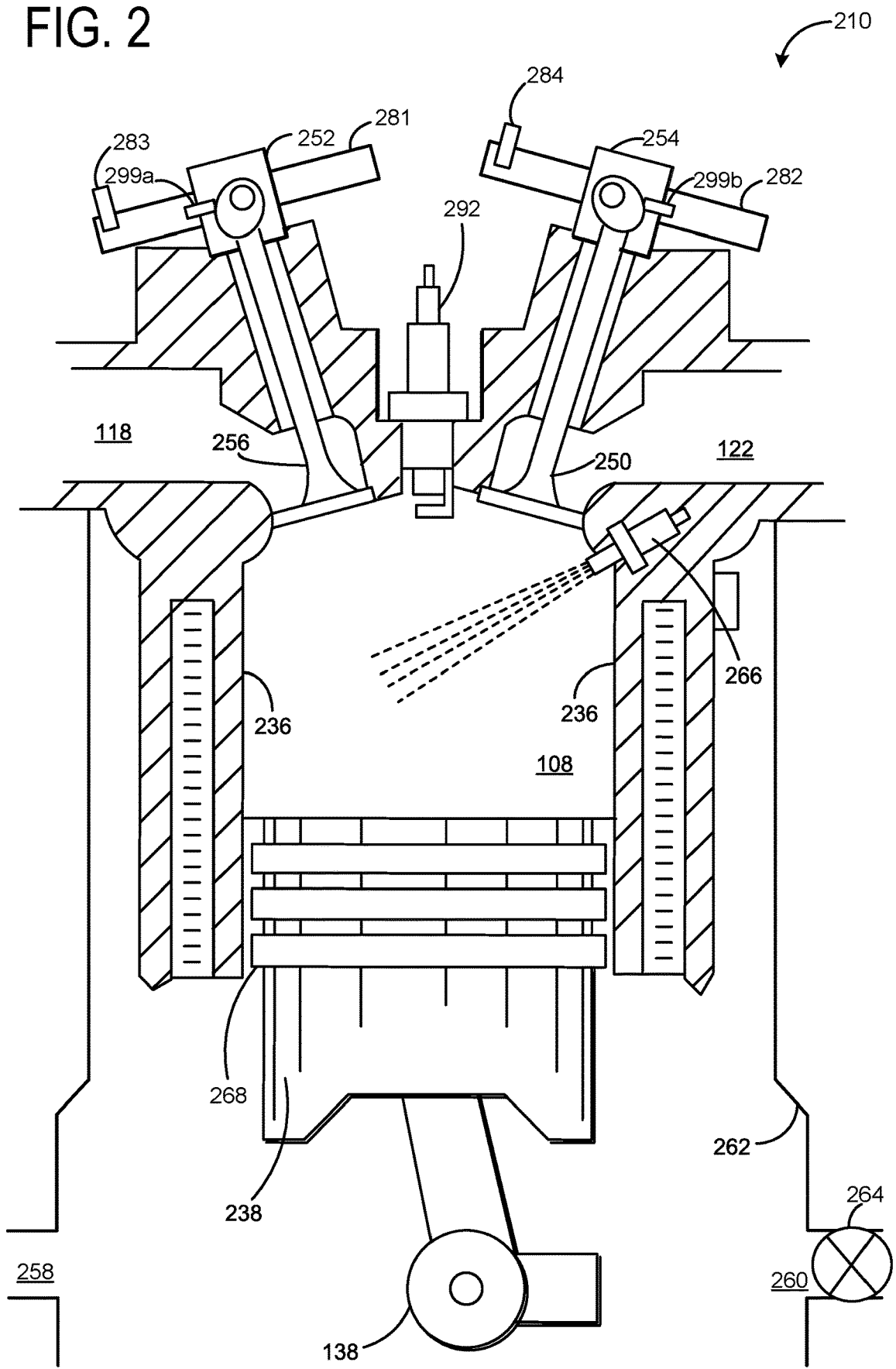
FIG. 2 schematically shows a single cylinder of an engine included in the vehicle system of FIG. 1

Switching from a single purge path to the dual-path may include engine system adjustments, such as adjustments to twin independent variable cam timing (TiVCT) as depicted at FIG. 2, transmission gearing adjustments, etc. Such methodology may be applicable to autonomous vehicles, such as the autonomous vehicle system of FIG. 3. For example, because an autonomous vehicle includes navigation sensors, vehicle speed may be controlled so as to bias the purge flow to the dual-path under circumstances where TiVCT adjustments and/or transmission gearing is insufficient to bias the purge flow to the dual-path.

An example graph depicting how a purge flow rate is increased over time during a purging operation is depicted at FIG. 4A. Another example graph that depicts purge flow path as a function of boost pressure and intake manifold vacuum is shown at FIG. 4B. The information at FIG. 4B may be incorporated into a flow map which may be used by a controller of the vehicle to adjust engine actuators to control the purge path to the dual-path under circumstances where the sudden increase in fuel vapor concentration being inducted to the engine is inferred.

Figure 5:
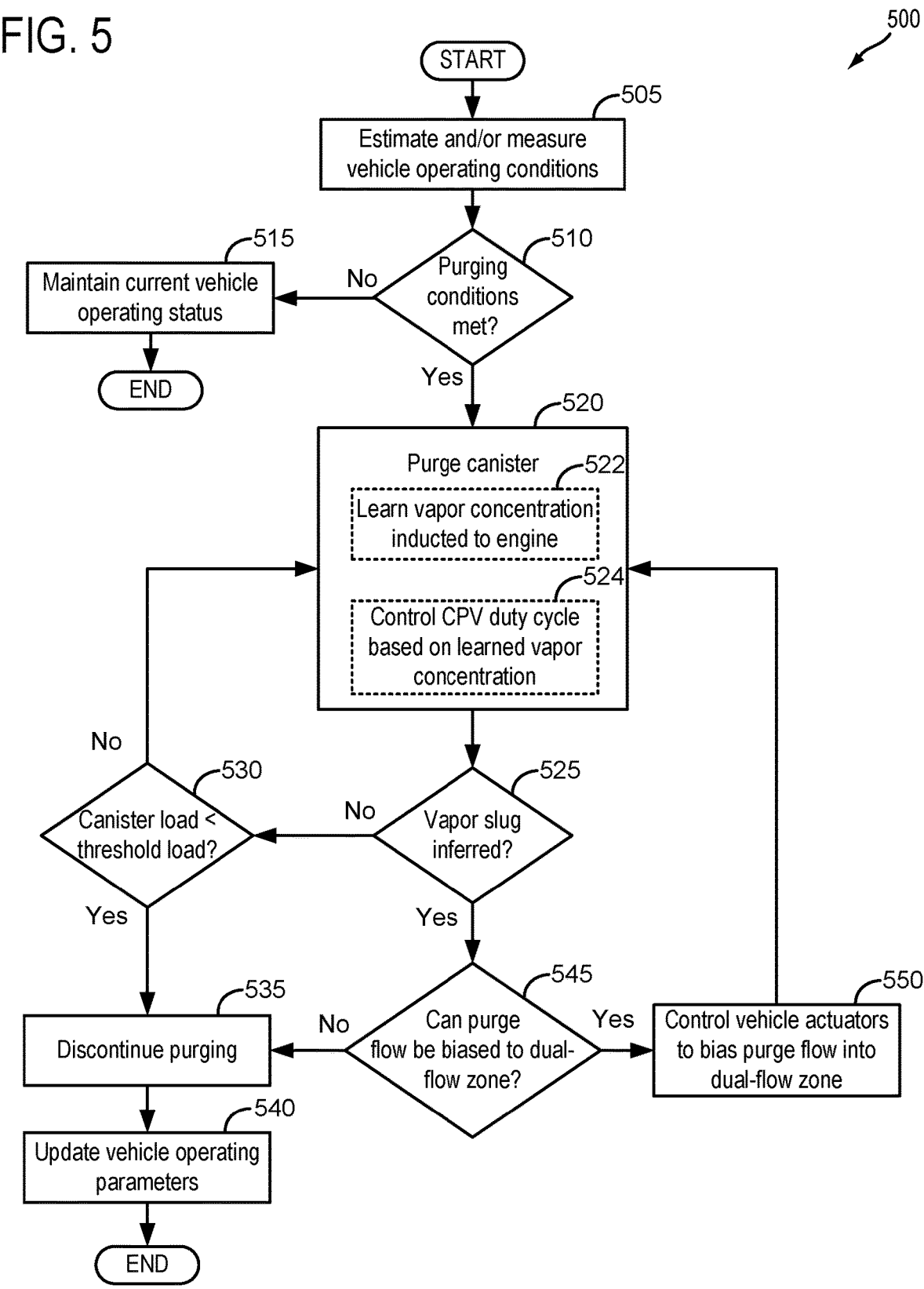
FIG. 5 depicts a high level example method for conducting a canister purging operation according to the present disclosure.
Figure 6:
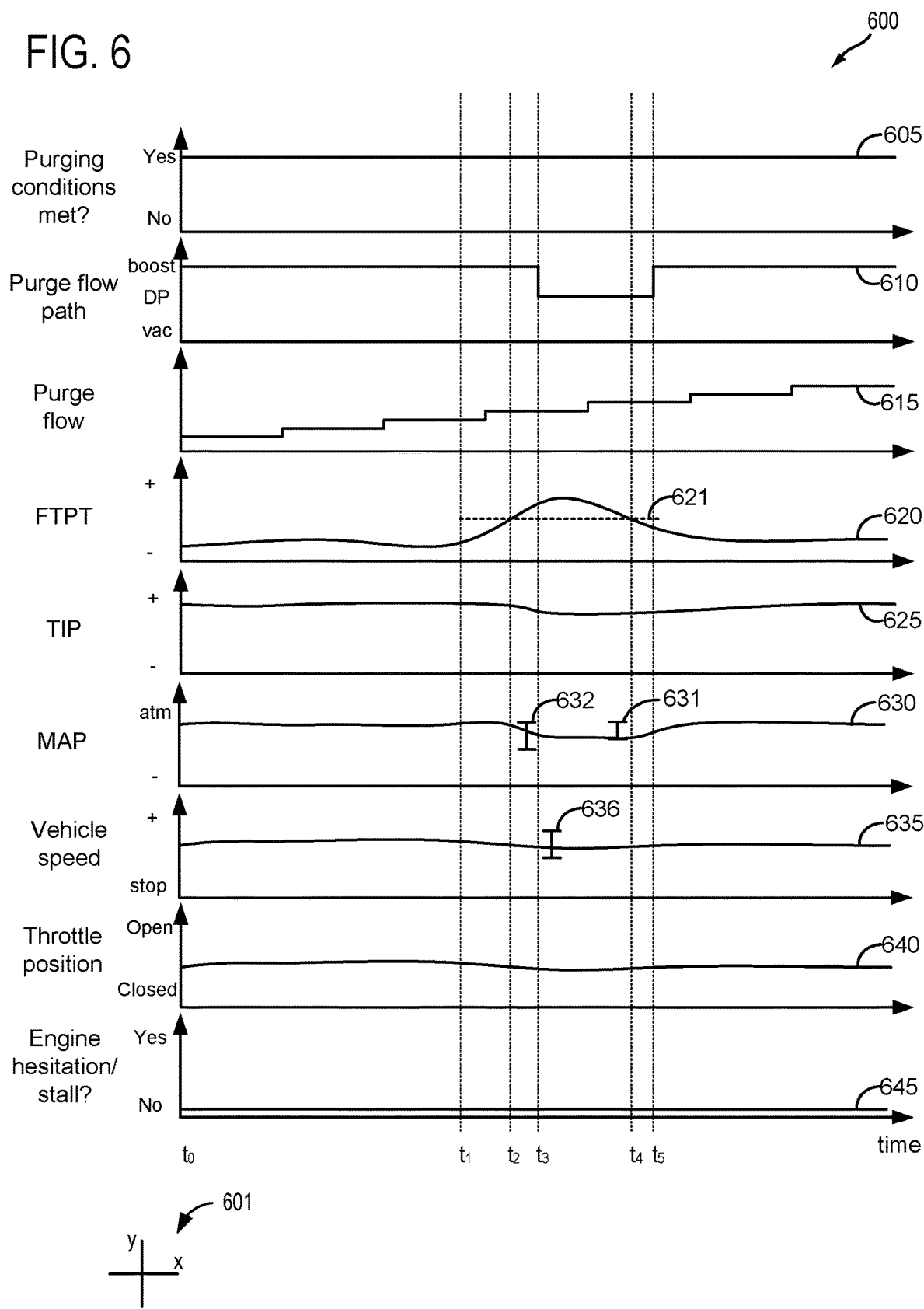
FIG. 6 depicts an example timeline for conducting a canister purging operation according to the method of FIG. 5 for a vehicle that is not autonomously operated.
Figure 7:
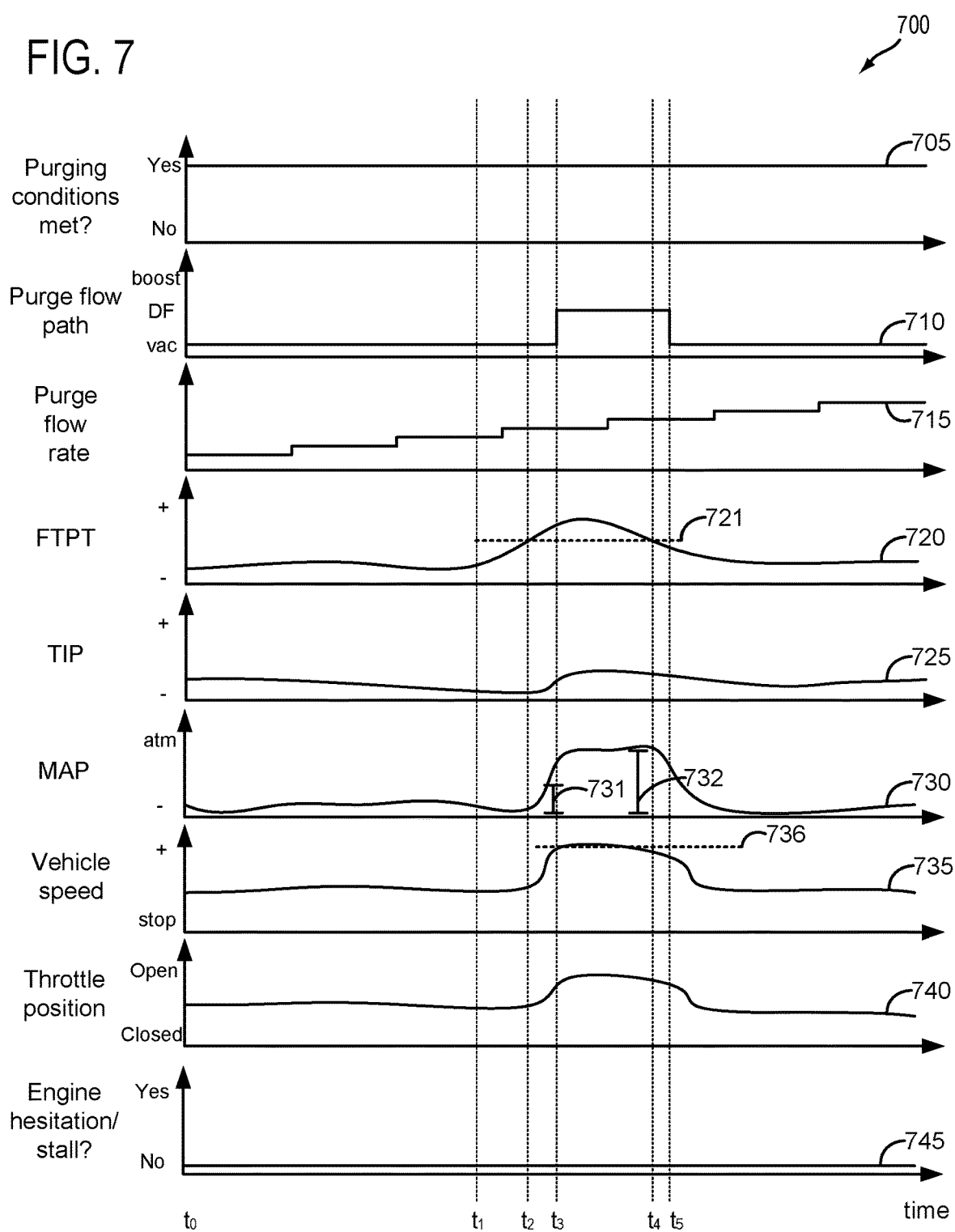
FIG. 7 depicts an example timeline for conducting a canister purging operation according to the method of FIG. 5 for a vehicle that is autonomously operated.
Figure 7:
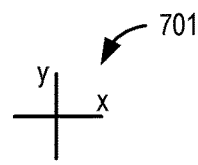
Figure 8:
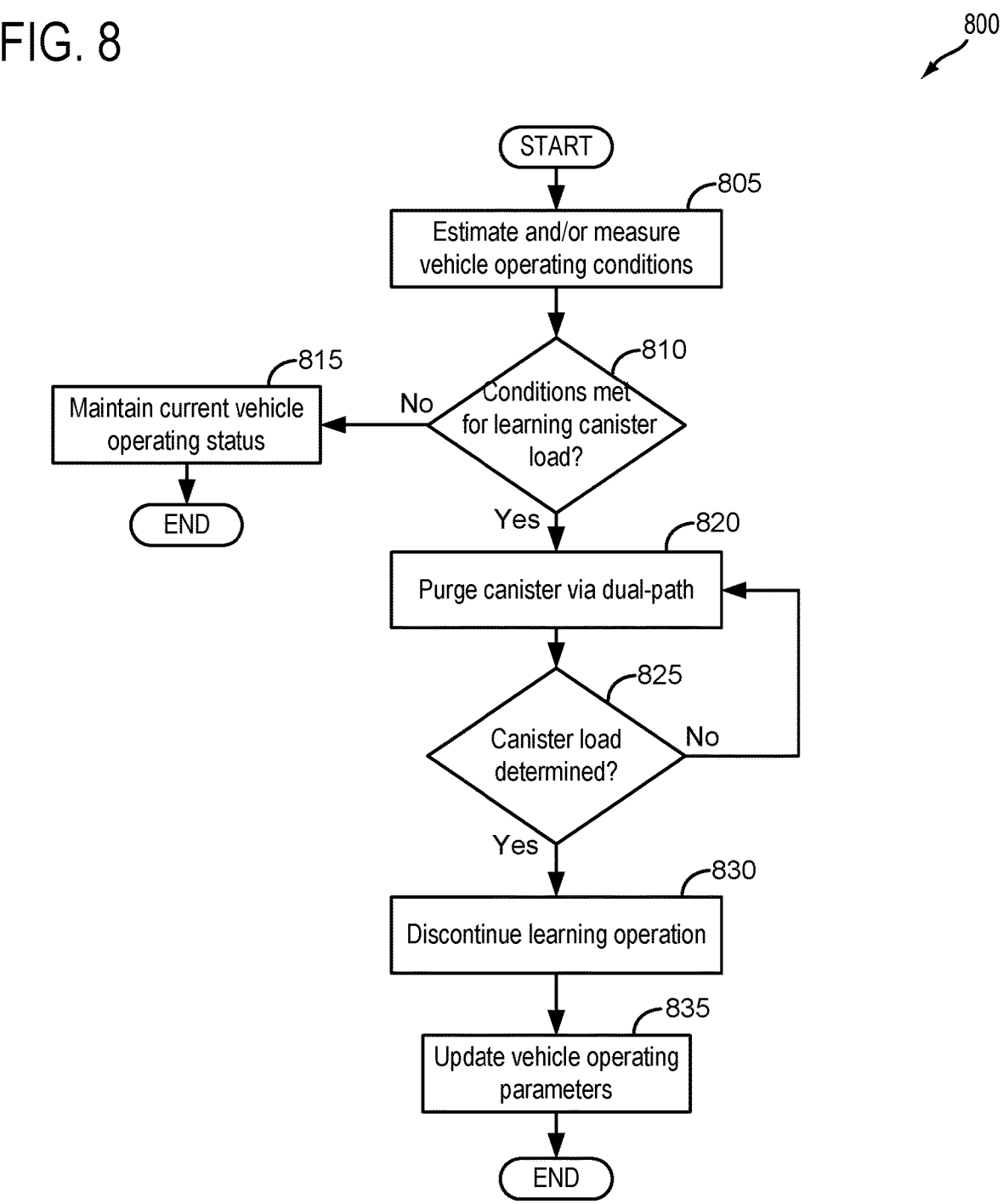
FIG. 8 depicts an example method for learning a canister loading state.
Figure 9:
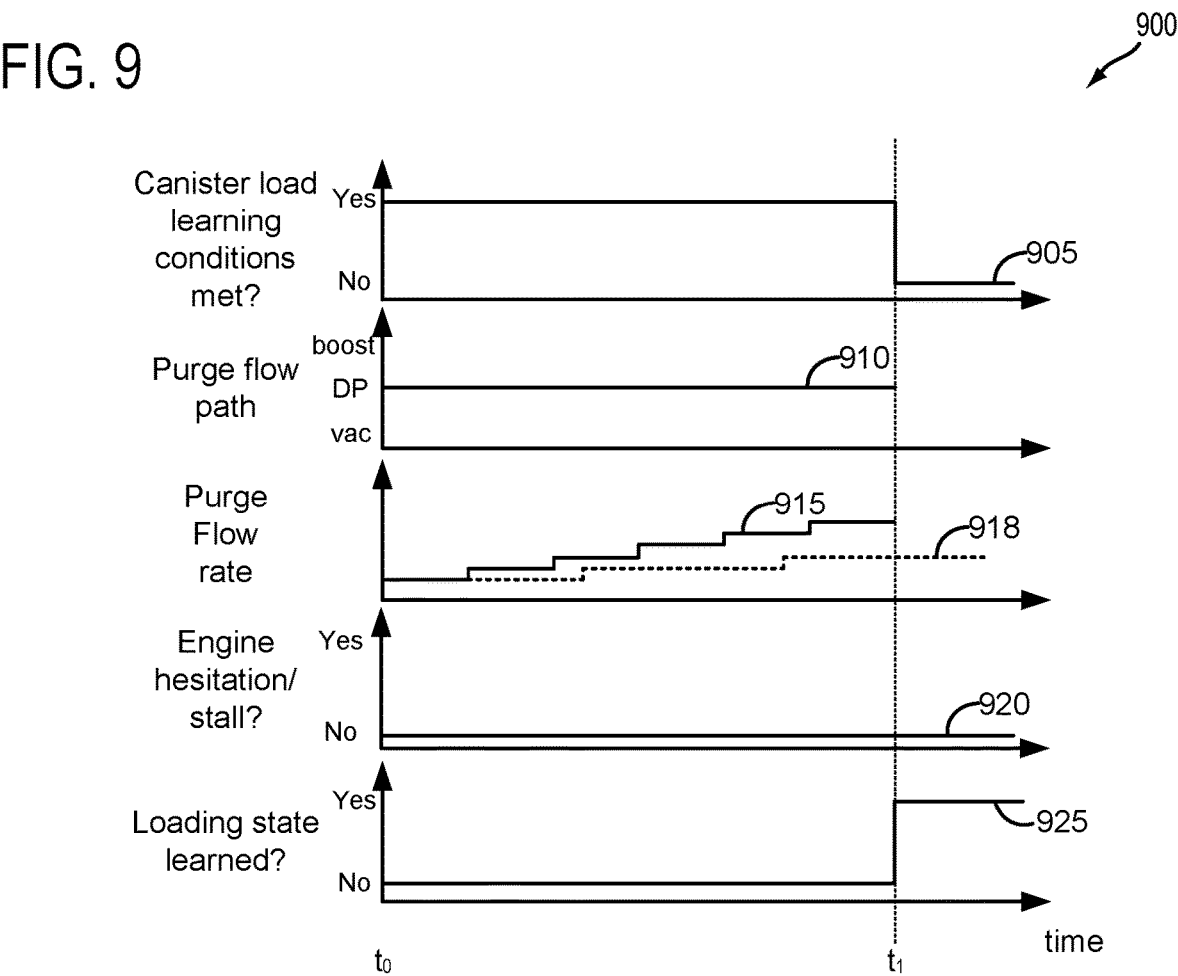
FIG. 9 depicts an example timeline for learning a canister loading state that relies on the method of FIG. 8.
Figure 9:
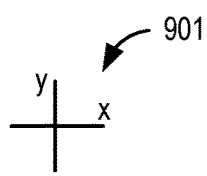

Depicted at FIG. 5 is an example method for controlling the path of fuel vapors during a canister purging event. FIG. 6 depicts an example timeline that illustrates how the method of FIG. 5 may be used during a purging operation when the vehicle is a non-autonomous vehicle. FIG. 7 depicts an example timeline that illustrates how the method of FIG. 5 may be used during a purging operation when the vehicle is an autonomous vehicle. FIG. 8 depicts an example method for learning a canister load, which relies on purging the canister via the dual-path, such that a rate of purge flow can be increased rapidly to allow for faster learning of the canister load. FIG. 9 depicts an example timeline depicting how the method of FIG. 8 may be used to learn a canister loading state.

Figure 1:
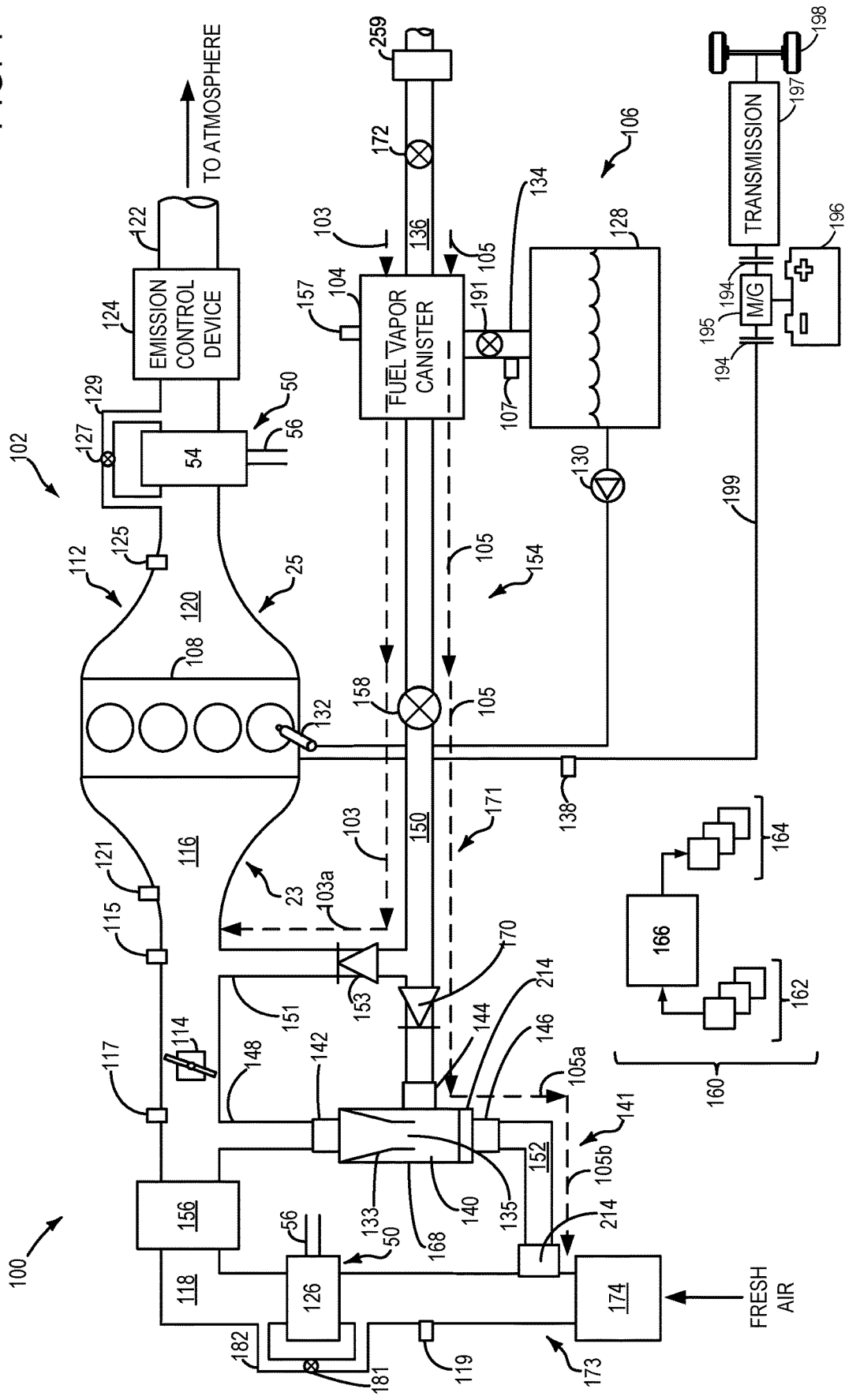
FIG. 1 shows a schematic diagram of a multi-path fuel vapor recovery system of a vehicle system.

Turning to the figures, FIG. 1 shows a schematic depiction of a vehicle system 100. The vehicle system 100 includes an engine system 102 coupled to a fuel vapor recovery system (evaporative emissions control system) 154 and a fuel system 106. The engine system 102 may include an engine 112 having a plurality of cylinders 108. The engine 112 includes an engine intake 23 and an engine exhaust 25. The engine intake 23 includes a throttle 114 fluidly coupled to the engine intake manifold 116 via an intake passage 118. An air filter 174 is positioned upstream of throttle 114 in intake passage 118. In some examples, throttle 114 may be electronically actuated, under control of controller 166. The engine exhaust 25 includes an exhaust manifold 120 leading to an exhaust passage 122 that routes exhaust gas to the atmosphere. The engine exhaust 122 may include one or more emission control devices 124, which may be mounted in a close-coupled position in the exhaust. One or more emission control devices may include a three-way catalyst, lean NOx trap, diesel particulate filter, oxidation catalyst, etc. It will be appreciated that other components may be included in the vehicle system, such as a variety of valves and sensors, as further elaborated below.

Throttle 114 may be located in intake passage 118 downstream of a compressor 126 of a boosting device, such as turbocharger 50, or a supercharger. Compressor 126 of turbocharger 50 may be arranged between air filter 174 and throttle 114 in intake passage 118. Compressor 126 may be at least partially powered by exhaust turbine 54, arranged between exhaust manifold 120 and emission control device 124 in exhaust passage 122. Compressor 126 may be coupled to exhaust turbine 54 via shaft 56. Compressor 126 may be configured to draw in intake air at atmospheric air pressure into an air induction system (AIS) 173 and boost it to a higher pressure. Using the boosted intake air, a boosted engine operation may be performed.

An amount of boost may be controlled, at least in part, by controlling an amount of exhaust gas directed through exhaust turbine 54. In one example, when a larger amount of boost is requested, a larger amount of exhaust gases may be directed through the turbine. Alternatively, for example when a smaller amount of boost is requested, some or all of the exhaust gas may bypass turbine 54 via a turbine bypass passage as controlled by wastegate valve 127 positioned in wastegate conduit 129. An amount of boost may additionally or optionally be controlled by controlling an amount of intake air directed through compressor 126. Controller 166 may adjust an amount of intake air that is drawn through compressor 126 by adjusting the position of compressor bypass valve 181 positioned in compressor bypass conduit 182. In one example, when a larger amount of boost is requested, a smaller amount of intake air may be directed through the compressor bypass conduit.

Fuel system 106 may include a fuel tank 128 coupled to a fuel pump system 130. The fuel pump system 130 may include one or more pumps for pressurizing fuel delivered to fuel injectors 132 of engine 112. While only a single fuel injector 132 is shown, additional injectors may be provided for each cylinder. For example, engine 112 may be a direct injection gasoline engine and additional injectors may be provided for each cylinder. It will be appreciated that fuel system 106 may be a return-less fuel system, a return fuel system, or various other types of fuel system. In some examples, a fuel pump may be configured to draw the tank's liquid from the tank bottom. Vapors generated in fuel system 106 may be routed to fuel vapor recovery system (evaporative emissions control system) 154 via conduit 134, before being purged to the engine intake 23.

Fuel vapor recovery system 154 (herein referred to as evaporative emissions control system, or evaporative emissions system) includes a fuel vapor retaining device, depicted herein as fuel vapor canister 104. Canister 104 may be filled with an adsorbent capable of binding large quantities of vaporized HCs. In one example, the adsorbent used is activated charcoal. Canister 104 may receive fuel vapors from fuel tank 128 through conduit 134. While the depicted example shows a single canister, it will be appreciated that in alternate embodiments, a plurality of such canisters may be connected together. Canister 104 may communicate with the atmosphere through vent 136. In some examples, vent line 136 may include an air filter 259 disposed therein upstream of a canister 104. In some examples, canister vent valve 172 may be located along vent 136, coupled between the fuel vapor canister and the atmosphere, and may adjust a flow of air and vapors between canister 104 and the atmosphere. In one example, operation of canister vent valve 172 may be regulated by a canister vent solenoid (not shown). For example, based on whether the canister is to be purged or not, the canister vent valve may be opened or closed.

Furthermore, in some examples, one or more oxygen sensors 121 may be positioned in the engine intake 116, or coupled to the canister 104 (e.g., downstream of the canister), to provide an estimate of canister load. In still further examples, one or more temperature sensors 157 may be coupled to and/or within canister 104. For example, as fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister, and may be used to estimate canister load. In still other examples, output from exhaust gas oxygen sensor 125 may be relied upon for learning fuel vapor concentration stemming from the canister and/or estimating canister loading state.

Conduit 134 may optionally include a vapor bypass valve (VBV) 191. VBV 191 may include a notch opening or orifice (not shown), such that even when closed, the fuel tank may be allowed to vent pressure through said notch opening or orifice. A size of the notch opening or orifice may be calibratable. In one example, the notch opening or orifice may comprise a diameter of 0.09″, for example. During regular engine operation, VBV 191 may be kept closed to limit the amount of diurnal or "running loss" vapors directed to canister 104 from fuel tank 128. During refueling operations, and selected purging conditions, VBV 191 may be temporarily opened (e.g. for a duration) to direct fuel vapors from the fuel tank 128 to canister 104. While the depicted example shows VBV 191 positioned along conduit 134, in alternate embodiments, the VBV may be mounted on fuel tank 128. The fuel tank 128 may hold a plurality of fuel blends, including fuel with a range of alcohol concentrations, such as various gasoline-ethanol blends, including E10, E85, gasoline, etc., and combinations thereof.

Fuel vapor recovery system 154 may include a dual path purge system 171. Purge system 171 is coupled to canister 104 via a conduit 150. Conduit 150 may include a canister purge valve (CPV) 158 disposed therein. Specifically, CPV 158 may regulate the flow of vapors along duct 150. The quantity and rate of vapors released by CPV 158 may be determined by the duty cycle of an associated CPV solenoid (not shown). In one example, the duty cycle of the CPV solenoid may be determined by controller 166 responsive to engine operating conditions, including, for example, an air-fuel ratio. By commanding the CPV to be closed, the controller may seal the fuel vapor canister from the fuel vapor purging system, such that no vapors are purged via the fuel vapor purging system. In contrast, by commanding the CPV to be open, the controller may enable the fuel vapor purging system to purge vapors from the fuel vapor canister.

Fuel vapor canister 104 operates to store vaporized hydrocarbons (HCs) from fuel system 106. Under some operating conditions, such as during refueling, fuel vapors present in the fuel tank may be displaced when liquid is added to the tank. The displaced air and/or fuel vapors may be routed from the fuel tank 128 to the fuel vapor canister 104, and then to the atmosphere through vent 136. In this way, vaporized HCs may be stored in fuel vapor canister 104. During a later engine operation, the stored vapors may be released back into the incoming air charge via fuel vapor purging system 171 (also referred to herein as dual-path fuel vapor purging system, or dual-path purging system).

Conduit 150 is coupled to an ejector 140 in an ejector system 141 and includes a second check valve (CV2) 170 disposed therein. Second check valve (CV2) 170 may prevent intake air from flowing through from the ejector into conduit 150, while allowing flow of air and fuel vapors from conduit 150 into ejector 140. CV2 170 may be a vacuum-actuated check valve, for example, that opens responsive to vacuum derived from ejector 140.

A conduit 151 couples conduit 150 to intake 23 at a position within conduit 150 between check valve 170 and CPV 158 and at a position in intake 23 downstream of throttle 114. For example, conduit 151 may be used to direct fuel vapors from canister 104 to intake 23 using vacuum generated in intake manifold 116 during a purge event. Conduit 151 may include a first check valve (CV1) 153 disposed therein. First check valve (CV1) 153 may prevent intake air from flowing through from intake manifold 116 into conduit 150, while allowing flow of fluid and fuel vapors from conduit 150 into intake manifold 116 via conduit 151 during a canister purging event. CV1 may be a vacuum actuated check valve, for example, that opens responsive to vacuum derived from intake manifold 116.

Conduit 148 may be coupled to ejector 140 at a first port or inlet 142. Ejector 140 includes a second port 144 or inlet coupling ejector 140 to conduit 150. Ejector 140 is coupled to intake 23 at a position upstream of throttle 114 and downstream of compressor 126 via a conduit 148. During boost conditions, conduit 148 may direct compressed air in intake conduit 118 downstream of compressor 126 into ejector 140 via port 142.

Ejector 140 may also be coupled to intake conduit 118 at a position upstream of compressor 126 via a shut-off valve 214. Shut-off valve 214 is hard-mounted directly to air induction system 173 along conduit 118 at a position between air filter 174 and compressor 126. For example, shut-off valve 214 may be coupled to an existing AIS nipple or other orifice, e.g., an existing SAE male quick connect port, in AIS 173. Hard-mounting may include a direct mounting that is inflexible. For example, an inflexible hard mount could be accomplished through a multitude of methods including spin welding, laser bonding, or adhesive. Shut-off valve 214 is coupled to a third port 146 or outlet of ejector 140. Shut-off valve 214 is configured to close in response to undesired emissions detected downstream of outlet 146 of ejector 140. As shown in FIG. 1, in some examples, a conduit or hose 152 may couple the third port 146 or outlet of ejector 140 to shut-off valve 214. In this example, if a disconnection of shut-off valve 214 with AIS 173 is detected, then shut-off valve 214 may close so air flow from the engine intake downstream of the compressor through the converging orifice 135 in the ejector is discontinued. However, in other examples, shut-off valve 214 may be integrated with ejector 140 and directly coupled thereto.

Ejector 140 includes a housing 168 coupled to ports 146, 144, and 142. In one example, only the three ports 146, 144, and 142 are included in ejector 140. Ejector 140 may include various check valves disposed therein. In some examples, ejector 140 may include a check valve positioned adjacent to each port in ejector 140 so that unidirectional flow of fluid or air is present at each port. For example, air from intake conduit 118 downstream of compressor 126 may be directed into ejector 140 via inlet port 142 and may flow through the ejector and exit the ejector at outlet port 146 before being directed into intake conduit 118 at a position upstream of compressor 126. This flow of air through the ejector may create a vacuum due to the Venturi effect at inlet port 144 so that vacuum is provided to conduit 150 via port 144 during boosted operating conditions. In particular, a low pressure region is created adjacent to inlet port 144 which may be used to draw purge vapors from the canister into ejector 140.

Ejector 140 includes a nozzle 133 comprising an orifice 135 which converges in a direction from port 142 toward suction inlet or port 144 so that when air flows through ejector 140 in a direction from port 142 towards port 146, a vacuum is created at port 144 due to the Venturi effect. This vacuum may be used to assist in fuel vapor purging during certain conditions, e.g., during boosted engine conditions. In one example, ejector 140 is a passive component. That is, ejector 140 is designed to provide vacuum to the fuel vapor purge system via conduit 150 to assist in purging under various conditions, without being actively controlled. Thus, whereas CPV 158 and throttle 114 may be controlled via controller 166, for example, ejector 140 may be neither controlled via controller 166 nor subject to any other active control. In another example, the ejector may be actively controlled with a variable geometry to adjust an amount of vacuum provided by the ejector to the fuel vapor recovery system via conduit 150.

During select engine and/or vehicle operating conditions, such as after an emission control device light-off temperature has been attained (e.g., a threshold temperature reached after warming up from ambient temperature) and with the engine running, the controller 166 may control CVV 172. For example, CVV 172 may be commanded open, except during evaporative emissions test diagnostics. At the same time, controller 166 may adjust the duty cycle of the CPV solenoid (not shown), thereby opening CPV 158. Pressures within fuel vapor purging system 171 may then draw fresh air through vent 136, fuel vapor canister 104, and CPV 158 such that fuel vapors flow into conduit 150.

The operation of ejector 140 within fuel vapor purging system 171 during vacuum conditions will now be described. The vacuum conditions may include intake manifold vacuum conditions. For example, intake manifold vacuum conditions may be present during an engine idle condition, with manifold pressure below atmospheric pressure by a threshold amount. This vacuum in the intake system 23 may draw fuel vapor from the canister through conduits 150 and 151 into intake manifold 116, as represented by dashed line(s) 103 and 103a.

Next, the operation of ejector 140 within fuel vapor purging system 171 during boost conditions will be described. The boost conditions may include conditions during which the compressor is in operation.

Fresh air enters intake passage 118 at air filter 174. During boost conditions, compressor 126 pressurizes the air in intake passage 118. Pressure in intake passage 118 upstream of compressor 126 is lower than intake manifold pressure during operation of compressor 126, and this pressure differential induces a flow of fluid from intake conduit 118 through duct 148 and into ejector 140 via ejector inlet 142. This fluid may include a mixture of air and fuel, in some examples. After the fluid flows into the ejector via the port 142, it flows through the converging orifice 135 in nozzle 133 in a direction from port 142 towards outlet 146. Because the diameter of the nozzle gradually decreases in a direction of this flow, a low pressure zone is created in a region of orifice 135 adjacent to suction inlet 144. The pressure in this low pressure zone may be lower than a pressure in duct 150. When present, this pressure differential provides a vacuum to conduit 150 to draw fuel vapor from canister 104, as indicated via dashed line(s) 105. This pressure differential may further induce flow of fuel vapors from the fuel vapor canister, through the CPV, and into port 144 of ejector 140. Upon entering the ejector, the fuel vapors may be drawn along with the fluid from the intake manifold out of the ejector via outlet port 146 and into intake 118 at a position upstream of compressor 126, as indicated via dashed lines 105a and 105b. Operation of compressor 126 then draws the fluid and fuel vapors from ejector 140 into intake passage 118 and through the compressor. After being compressed by compressor 126, the fluid and fuel vapors flow through charge air cooler 156, for delivery to intake manifold 116 via throttle 114.

Thus, herein, it may be understood that the fuel vapor canister may be coupled to an air intake of the engine through a first path having a first check valve 153, where the first path may include conduits 150 and 151, and in some examples conduit 148 as well. Furthermore, it may be understood that the fuel vapor canister may be coupled to an air intake of the engine through a second path having a second check valve 170. The second path may include conduits 150 and 152. Discussed herein, the first path may be referred to as a vacuum purge path, or vacuum flow path, or simply, vacuum path. Furthermore, the second path may be referred to as a boost purge path, or boost flow path, or simply, boost path. In certain vehicle operating conditions, purge vapors may all flow through the vacuum purge path, without being routed through the boost purge path. In other vehicle operating conditions, purge vapors may all flow through the boost purge path, without being routed through the vacuum purge path. However, as will be discussed in detail below with regard to the method of FIG. 5, in some examples it may be desirable to route fuel vapors from the canister through both the vacuum purge path and the boost purge path at the same time. Such a circumstance may include a sudden increase in vapor amount or concentration being inducted to the engine, such as may occur in response to a fuel slosh event where fuel in the fuel tank is hot, thus leading to a rapid increase in fuel vapor generation in the fuel tank. If a purging event via a single path (e.g., only the vacuum path or only the boost path) is in progress when such an event occurs, the increased fuel vapors may be sucked into the engine which may result in engine hesitation or in some examples, engine stall. Discussed herein, the rapid increase in fuel vapor generation and subsequent routing of the fuel vapors to the engine may be referred to as a vapor slug.

As will be elaborated in further detail below with regard to the method of FIG. 5, upon detection of such an increase in fuel vapor generation, by switching the path of fuel vapor flow from one path (e.g. substantially all fuel vapor flow through the vacuum purge path, or substantially all fuel vapor flow through the boost purge path) to a dual-path (e.g. some amount of fuel vapors routed through the vacuum purge path while another, remaining amount of fuel vapors routed through the boost purge path), the fuel vapors may be distributed or dispersed in time, which may result in a reduction or avoidance altogether of issues pertaining to engine hesitation and/or stall. For example, a time it takes to route fuel vapors from the canister to the engine may be lesser for the vacuum purge path as compared to the boost purge path. Said another way, a transport delay from when fuel vapors exit the canister to when they enter the engine may be less for the vacuum purge path than the boost purge path. More specifically, the transport delay may be 4-6 seconds or greater for the boost purge path, whereas the transport delay may be 2 seconds or less for the vacuum purge path. By separating or distributing the flow of fuel vapors along different flow paths, opportunity for engine hesitation and/or stall may be reduced or avoided, as discussed. As referred to above, it may be understood that "substantially all" may refer to 95% of fuel vapors being routed through one path and 5% of fuel vapors being routed through the other path, in one example. In another example, "substantially all" may refer to 99% of fuel vapors being routed through one path and 1% being routed through the other path. In still another example, substantially all may refer to greater than 99% of fuel vapors being routed through one path and less than 1% of fuel vapors being routed through the other path.

Vehicle system 100 may further include a control system 160. Control system 160 is shown receiving information from a plurality of sensors 162 (various examples of which are described herein) and sending control signals to a plurality of actuators 164 (various examples of which are described herein). As one example, sensors 162 may include an exhaust gas sensor 125 (located in exhaust manifold 120) and various temperature and/or pressure sensors arranged in intake system 23. For example, a pressure or airflow sensor 115 (also referred to as manifold air pressure sensor or MAP sensor) in intake conduit 118 downstream of throttle 114, a pressure or air flow sensor 117 in intake conduit 118 between compressor 126 and throttle 114, and a pressure or air flow sensor 119 in intake conduit 118 upstream of compressor 126. It may be understood that pressure sensor 117 may be used to infer a throttle inlet pressure (TIP). It may be further understood that pressure sensor 115 may be used to infer an intake manifold pressure. In some examples, pressure sensor 119 may comprise a dedicated barometric pressure sensor. Other sensors such as additional pressure, temperature, air/fuel ratio, and composition sensors may be coupled to various locations in the vehicle system 100. As another example, actuators 164 may include fuel injectors 132, throttle 114, compressor 126, a fuel pump of pump system 130, etc. The control system 160 may include an electronic controller 166. The controller may receive input data from the various sensors, process the input data, and trigger the actuators in response to the processed input data based on instruction or code programmed therein corresponding to one or more routines.

Diagnostic tests may be periodically performed on the evaporative emissions control system 154 and fuel system 106 in order to indicate the presence or absence of undesired evaporative emissions. In one example, under natural aspiration conditions (e.g. intake manifold vacuum conditions), CVV 172 may be configured in a closed position to seal the fuel vapor canister 104 from atmosphere, and CPV 158 may be commanded open. By commanding CVV 172 closed and commanding open CPV 158 during natural aspiration conditions, the evaporative emissions control system 154 and fuel system 106 may be evacuated (as indicated via dashed lines 103, and 103*a*) in order to ascertain the presence or absence of undesired evaporative emissions, by monitoring pressure in the fuel system and evaporative emissions control system. Pressure in the fuel system and evaporative emissions control system may be monitored, for example, via a pressure sensor 107 (in a case where VBV 191 is commanded open for the test). In some examples pressure sensor 107 may comprise a fuel tank pressure transducer (FTPT). If a threshold vacuum (e.g. negative pressure threshold with respect to atmospheric pressure) is reached during evacuating the evaporative emissions control system 154 and fuel system 106, an absence of gross undesired evaporative emissions (e.g. source of undesired evaporative emissions greater than a diameter of 0.09") may be indicated. Furthermore, if the threshold vacuum is reached, then it may be indicated that the first check valve (CV1) 153 is not stuck closed or substantially closed, as in a case where CV1 153 is stuck closed, pressure sensor 107 may not indicate pressure changes. In some examples, upon reaching the threshold vacuum, the CPV may be commanded closed and pressure bleed-up may be monitored. If pressure bleed-up remains below a pressure bleed-up threshold, or if pressure bleeds-up at a rate slower than a bleed-up threshold rate, then an absence of non-gross undesired evaporative emissions (e.g. source of undesired evaporative emissions less than a diameter of 0.04", or less than a diameter of 0.02") may be indicated.

In another example, under boost conditions the CVV 172 may be commanded to the closed, and the CPV 158 may be commanded open. By commanding closed the CVV 172 and commanding open the CPV 158 during boost conditions, the evaporative emissions control system 154 and fuel system 106 may be evacuated (as indicated via dashed lines 105) in order to ascertain the presence or absence of undesired evaporative emissions. As discussed above, pressure in the fuel system and evaporative emissions control system may be monitored via, for example, pressure sensor 107. If a threshold vacuum (e.g., negative pressure threshold with respect to atmospheric pressure) is reached during evacuating the evaporative emissions control system 154 and fuel system 106, an absence of gross undesired evaporative emissions may be indicated. Furthermore, if the threshold vacuum is reached, then it may be indicated that the second check valve (CV2) 170 is not stuck closed or substantially closed, as in a case where CV2 170 is stuck closed, pressure sensor 107 may not indicate pressure changes. Similar to that discussed above, in a situation where the threshold vacuum is reached, the CPV may be commanded closed and pressure bleed-up monitored to ascertain the presence or absence of non-gross undesired evaporative emissions.

In some examples, the vehicle system 100 may be configured as a hybrid electric vehicle (HEV) or plug-in HEV (PHEV), with multiple sources of torque available to one or more vehicle wheels 198. In the example shown, vehicle system 100 may include an electric machine 195. Electric machine 195 may be a motor or a motor/generator. Crankshaft 199 of engine 112 and electric machine 195 are connected via a transmission 197 to vehicle wheels 198 when one or more clutches 194 are engaged. A crankshaft position sensor 138 may be included, in some examples. In the depicted example, a first clutch is provided between crankshaft 199 and electric machine 195, and a second clutch is provided between electric machine 195 and transmission 197. Controller 166 may send a signal to an actuator of each clutch 194 to engage or disengage the clutch, so as to connect or disconnect crankshaft 199 from electric machine 195 and the components connected thereto, and/or connect or disconnect electric machine 195 from transmission 197 and the components connected thereto. Transmission 197 may be a gearbox, a planetary gear system, or another type of transmission. The powertrain may be configured in various manners including as a parallel, a series, or a series-parallel hybrid vehicle.

Electric machine 195 receives electrical power from a traction battery 196 to provide torque to vehicle wheels 198. Electric machine 195 may also be operated as a generator to provide electrical power to charge traction battery 196, for example during a braking operation.

FIG. 2 depicts an example embodiment of a combustion chamber or cylinder that may be included in engine 112 depicted in FIG. 1. Cylinder (i.e. combustion chamber) 108 may include combustion chamber walls 236 with piston 238 positioned therein. Piston 238 may include one or more piston rings 268. The one or more piston rings 268 may function to seal cylinder 108, to assist with piston heat transfer, and to regulate oil consumption, for example. Piston 238 may be coupled to crankshaft 199 so that reciprocating motion of the piston is translated into rotational motion of the crankshaft. Crankshaft 199 may be coupled to at least one drive wheel of the passenger vehicle via a transmission system. Further, a starter motor or electric machine (e.g. electric machine 195 depicted at FIG. 1) may be coupled to crankshaft 199 via a flywheel to enable a starting operation of engine 112, and/or to rotate the engine in an unfueled mode.

Cylinder 108 can receive intake air via intake air passage 118, which may be one of a plurality of intake air passages coupled to cylinder 108. Intake air passage 118 may communicate with other cylinders of engine 112 in addition to cylinder 108. In some embodiments, one or more of the intake passages may include a boosting device such as a turbocharger or a supercharger. Exhaust passage 122 can receive exhaust gases from cylinder 108 as well as from other cylinders of engine 112.

Each cylinder of engine 112 may include one or more intake valves and one or more exhaust valves. For example, cylinder 108 is shown including at least one intake poppet valve 256 and at least one exhaust poppet valve 250 located at an upper region of cylinder 108. In some embodiments, each cylinder of engine 112, including cylinder 108, may include at least two intake poppet valves and at least two exhaust poppet valves located at an upper region of the cylinder.

Intake valve 256 may be controlled by the controller (e.g. controller 166 at FIG. 1) via actuator 252. Similarly, exhaust valve 250 may be controlled by the controller via actuator 254. During some conditions, the controller may vary the signals provided to actuators 252 and 254 to control the opening and closing of the respective intake and exhaust valves. The position of intake valve 256 and exhaust valve 250 may be determined by respective position sensors 299a and 299b, respectively. The valve actuators may be of the electric valve actuation type or cam actuation type, or a combination thereof. The intake and exhaust valve timing may be controlled concurrently or any of a possibility of variable intake cam timing, variable exhaust cam timing, twin independent variable cam timing (TiVCT), or fixed cam timing may be used. Each cam actuation system may include one or more cams (e.g. actuator 252 and/or 254) and may utilize one or more of cam profile switching (CPS), variable cam timing (VCT), variable valve timing (VVT) and/or variable valve lift (VVL) systems that may be operated by a controller to vary valve operation. For example, cylinder 108 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Shown for illustrative purposes at FIG. 2 is an example of TiVCT. Specifically, an intake camshaft 281 and an exhaust camshaft 282 are illustrated. It may be understood that such a configuration may enable the ability to advance or retard timing of both the intake camshaft 281 and the exhaust camshaft 282 independently. Such an ability may allow for improved power and torque, particularly at lower engine speed (engine RPM), as well as improved fuel economy and reduced emissions. Such an ability may further enable precise control over intake and exhaust valve position, which may include in some examples manipulating intake manifold vacuum in some examples.

In an example, a first oil pressure-controlled actuator 283 under control of the controller may regulate rotation of intake camshaft 281, and a second oil pressure-controlled actuator 284 may regulate rotation of second camshaft 282. In this way the first and second oil pressure-controlled actuators may control the camshafts to advance or retard engine timing based on operating conditions. For example, the controller may utilize crankshaft position sensor 138 and position sensor(s) 299a and 299b to determine engine timing.

While the example depicted herein at FIG. 2 illustrates the actuators (e.g. 283 and 284) of the camshafts as oil pressure-controlled, there may be some examples where instead of oil pressure driven cam phasing, cam torque actuation (CTA) may be employed, which may utilize existing torsional energy in the valve train to rotate the camshaft(s), as is commonly understood in the art.

In some embodiments, each cylinder of engine 112 may include a spark plug 292 for initiating combustion. An ignition system (not shown) can provide an ignition spark to cylinder 108 via spark plug 292 in response to a spark advance signal from a controller, under select operating modes. However, in some embodiments, spark plug 292 may be omitted, such as where engine 112 may initiate combustion by auto-ignition or by injection of fuel as may be the case with some diesel engines.

In some embodiments, each cylinder of engine 112 may be configured with one or more fuel injectors for providing fuel thereto. As a non-limiting example, cylinder 108 may include two fuel injectors (e.g., a port fuel injector and a direct fuel injector). Fuel injector 266 is shown coupled directly to cylinder 108 for injecting fuel directly therein in proportion to a pulse width of a signal received from a controller via an electronic driver. In this manner, fuel injector 266 provides what is known as direct injection (hereafter referred to as "DI") of fuel into cylinder 108. While FIG. 2 shows injector 266 as a side injector, it may also be located overhead of the piston, such as near the position of spark plug 292. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 266 from a high pressure fuel system including a fuel tank, fuel pumps, a fuel rail, etc. Alternatively, fuel may be delivered by a single stage fuel pump at lower pressure, in which case the timing of the direct fuel injection may be more limited during the compression stroke than if a high pressure fuel system is used.

A positive crackcase ventilation (PCV) system, may be coupled to the engine intake so that gasses in the crankcase 262 may be vented in a controlled manner from the crankcase. Engine 112 may include a crankcase ventilation tube 258, and a PCV line 260 in order to vent gasses out of the crankcase 262 and into intake manifold. In some examples PCV line 260 may include PCV valve 264, which may be an electronically controlled valve (e.g., a powertrain control module (PCM) controlled valve) wherein a controller may command a signal to change a position of the valve from an open position (or a position of high flow) to a closed position (or a position of low flow), or vice versa, or any position there-between.

As described above, FIG. 2 shows only one cylinder of a multi-cylinder engine. As such each cylinder may similarly include its own set of intake/exhaust valves, fuel injector(s), spark plugs, piston rings, etc.

The systems and method discussed herein may be applicable to autonomous vehicles. Accordingly, turning now to FIG. 3, a block diagram of an example autonomous driving system 300 that may operate, for example, the vehicle system 100, described above at FIG. 1. Herein, the vehicle system 100 will be referred to simply as a "vehicle". The autonomous driving system 300, as shown, includes a user interface device 310, a navigation system 315, at least one autonomous driving sensor 320, an autonomous mode controller 325, and vehicle subsystems 330.

The user interface device 310 may be configured to present information to vehicle occupants, under conditions wherein a vehicle occupant may be present. However, it may be understood that the vehicle may be operated autonomously in the absence of vehicle occupants, under certain conditions. The presented information may include audible information or visual information. Moreover, the user interface device 310 may be configured to receive user inputs. Thus, the user interface device 310 may be located in the passenger compartment (not shown) of the vehicle. In some possible approaches, the user interface device 310 may include a touch-sensitive display screen.

The navigation system 315 may be configured to determine a current location of the vehicle using, for example, a Global Positioning System (GPS) receiver configured to triangulate the position of the vehicle relative to satellites or terrestrial based transmitter towers. The navigation system 315 may be further configured to develop routes from the current location to a selected destination, as well as display a map and present driving directions to the selected destination via, for example, the user interface device 310.

The autonomous driving sensors 320 may include any number of devices configured to generate signals that help navigate the vehicle. Examples of autonomous driving sensors 320 may include a radar sensor, a lidar sensor, a vision sensor (e.g. a camera), vehicle to vehicle infrastructure networks, or the like. For example, the vehicle control system 160 may broadcast and receive information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The autonomous driving sensors 320 may enable the vehicle to "see" the roadway and vehicle surroundings, and/or negotiate various obstacles while the vehicle 100 is operating in autonomous mode. The autonomous driving sensors 320 may be configured to output sensor signals to, for example, the autonomous mode controller 325.

The autonomous mode controller 325 may be configured to control one or more subsystems 330 while the vehicle is operating in the autonomous mode. Examples of subsystems 330 that may be controlled by the autonomous mode controller 325 may include a brake subsystem, a suspension subsystem, a steering subsystem, and a powertrain subsystem. The autonomous mode controller 325 may control any one or more of these subsystems 330 by outputting signals to control units associated with subsystems 330. In one example, the brake subsystem may comprise an anti-lock braking subsystem, configured to apply a braking force to one or more of wheels (e.g. 130). Discussed herein, applying the braking force to one or more of the vehicle wheels may be referred to as activating the brakes. To autonomously control the vehicle, the autonomous mode controller 325 may output appropriate commands to the subsystems 330. The commands may cause the subsystems to operate in accordance with the driving characteristics associated with the selected driving mode. For example, driving characteristics may include how aggressively the vehicle accelerates and decelerates, how much space the vehicle leaves behind a front vehicle, how frequently the autonomous vehicle changes lanes, etc.

As mentioned above, a duty cycle of a CPV (e.g. CPV 158 depicted at FIG. 1) may be ramped up over time during a canister purging operation so that the purge flow rate at which fuel vapors are inducted to the engine increases over time. By ramping up the CPV duty cycle over time, rather than simply commanding and maintaining fully open the CPV, an amount or concentration of fuel vapors being inducted to the engine may be learned over time, and the duty cycle may be adjusted or controlled accordingly. Such action may be used to avoid issues pertaining to engine hesitation and/or stall which may otherwise occur if the CPV were simply commanded fully open for purging the canister. It may be understood that learning the concentration of fuel vapors being inducted to the engine may be based on output from the exhaust gas sensor (e.g. exhaust gas sensor 125 at FIG. 1), which may comprise for example a heated exhaust gas oxygen sensor, a universal exhaust gas oxygen sensor, etc. Additionally or alternatively, learning the concentration of fuel vapors being inducted to the engine may include monitoring a temperature change of the canister via the canister temperature sensor(s) (e.g. canister temperature sensor 157 at FIG. 1) during canister purging. As discussed above, as fuel vapors are desorbed from the canister, a rate or amount of canister cooling may be relied upon for learning the amount of fuel vapors being inducted to the engine.

Thus, discussed herein, a system for a vehicle comprises an engine, and a compressor coupled to an engine intake for providing a boosted aircharge to the engine. Such a system may further include a fuel vapor storage canister positioned in an evaporative emissions system. Such a system may further include a dual-path purge system that includes a vacuum path and a boost path for purging fuel vapors from the fuel vapor storage canister to the engine, the vacuum path including a conduit that couples the fuel vapor storage canister to the engine intake downstream of the compressor and the boost path including an ejector system that couples the fuel vapor storage canister to an air intake system at a position upstream of the compressor. Such a system may further include a controller with computer readable instructions stored in non-transitory memory that when executed cause the controller to purge the fuel vapor storage canister to the engine via one of the vacuum path and the boost path, and responsive to a vapor slug event where a concentration of fuel vapors being purged to the engine increases, adjust one or more of a vacuum level in an intake manifold of the engine and a boost pressure provided by the compressor to purge the fuel vapors to the engine intake along both the vacuum path and the boost path simultaneously.

Such a system may further comprise a fuel tank fluidically coupled to the fuel vapor storage canister and a fuel tank pressure transducer for monitoring fuel tank pressure. In such an example, the controller may store further instructions for inferring the vapor slug event based on a greater than threshold fuel tank pressure increase while the fuel vapor storage canister is being purged via the vacuum path or the boost path.

Such a system may further comprise a transmission and a twin independent variable cam timing system for the engine. In such an example, the controller may store further instructions to adjust a gearing of the transmission and/or control the twin independent variable cam timing system to adjust one or more of the vacuum level in the intake manifold of the engine and the boost pressure to switch the fuel vapors to be purged to engine intake along both the vacuum path and the boost path simultaneously.

Such a system may further comprise one or more sensors coupled to a navigation system and an intake throttle that is electronically actuatable, an exhaust turbine that couples to the compressor, a compressor bypass valve positioned in a compressor bypass conduit, a wastegate valve positioned in a wastegate conduit for bypassing a turbine. In such an example, the controller may store further instructions to determine a target vehicle speed where the vacuum level in the intake manifold and the boost pressure enable fuel vapors to be simultaneously purged along both the vacuum path and the boost path, retrieve navigation information from the navigation sensors; adjust a position of one or more of the intake throttle, the compressor bypass valve and the wastegate valve to control a speed of the vehicle to the target speed based on the navigation information retrieved from the navigation sensors.

Accordingly, FIG. 4A depicts graph 400, illustrating purge flow rate (y-axis) as a function of time (x-axis) (refer to inset 401). It may be understood that purge flow rate increases along the y-axis in the direction of the y-axis arrow, and time increases along the x-axis in the direction of the x-axis arrow. As depicted by plot 405, purge flow rate increases in step-wise fashion over the course of a canister purging operation. It may be understood that each time the purge flow rate increases in the step-wise fashion, the duty cycle of the CPV has been commanded by the controller to a new duty cycle where the CPV spends a greater proportion of time in the open state. While not specifically illustrated at FIG. 4A, it may be understood that in response to an indication that the canister is substantially clean (e.g. loaded to less than 5% with fuel vapors), the canister purging event may be discontinued by commanding the CPV closed.

While controlling the CPV duty cycle as a function of learned fuel vapor concentration may reduce chances for fuel vapors stemming from the canister to result in engine hesitation issues or engine stall issues, as discussed above, certain conditions (e.g. fuel slosh event under circumstances of fuel temperature greater than a threshold temperature) may result in fuel vapor generation in the fuel tank which, if not accounted for, may result in a vapor slug, or in other words an unaccounted for or unmetered increase in fuel vapors, being inducted to the engine. Said another way, because the duty cycle is controlled based on a learned amount of fuel vapors being inducted to the engine, any excess or increased amount that has not been taken into account may comprise an unmetered amount of fuel vapors which may in some examples result in engine hesitation or engine stall issues. It may be understood that such a sudden increase in fuel vapor generation and subsequent routing of the increased fuel vapor amount may occur under conditions where the VBV (e.g. VBV 191 at FIG. 1) is commanded open during purging, but may also occur with the VBV closed, under circumstances where the VBV includes a notch for venting fuel tank pressure, as discussed above. It may be further understood that inferring a vapor slug event may be based on a change in fuel tank pressure as monitored, for example, via the FTPT (e.g. FTPT 107 at FIG. 1), during a purging event. Additionally or alternatively, inferring a vapor slug event may be based an unexpected acceleration or deceleration event (e.g. acceleration or deceleration not corresponding to a change in accelerator pedal position).

To avoid issues such as engine hesitation and/or stall in response to vapor slug generation being inferred, in one example the canister purging operation may be suspended or discontinued. In other words, in response to vapor slug generation being inferred, the CPV may be commanded closed. However, discontinuing purging by commanding closed the CPV may result in the canister not being effectively cleaned of stored fuel vapors, which may lead to an increase in undesired evaporative emissions escaping from the canister to atmosphere in some examples. Furthermore, by discontinuing purging, a subsequent canister purging event may have to start the CPV duty cycle ramping process all over again. Such ramping of the CPV duty cycle, as discussed above, takes time, and opportunities for purging may not be frequent for certain vehicles including HEVs, PHEVs, start/stop (S/S) vehicles, etc. Thus, it may not be desirable to discontinue purging operations once started, if at all possible, as it may be challenging to find other opportunities for effectively cleaning the canister of stored fuel vapors.

Accordingly, as mentioned above, in some examples it may be possible to, rather than suspend a canister purging operation in response to a vapor-slug condition being inferred during the purging operation, control the purging operation so as to distribute the vapors along two paths (e.g. vacuum path and boost path) to the engine, rather than a single path (e.g. vacuum path or boost path). Because a time frame to route vapors to the engine takes longer along the boost path than the vacuum path, distributing the vapor flow into two paths may effectively reduce an amount of fuel vapors inducted to the engine at any one time point, which may reduce chance of the engine hesitating and/or stalling. As mentioned above, methodology for controlling fuel vapor flow to the dual-path is depicted at FIG. 5.

Turning to FIG. 4B, depicted is an example graph 450 showing purge flow path as a function of boost pressure and intake manifold pressure. Specifically, boost pressure (e.g. TIP) is depicted along the x-axis while intake manifold pressure (e.g. MAP) is depicted along the y-axis (refer to inset 451). It may be understood that boost pressure increases along the x-axis in the direction of the arrow, and manifold pressure becomes more negative along the y-axis in the direction of the arrow. It may be further understood that the pressure sensor (e.g. pressure sensor 117 at FIG. 1) positioned in the intake conduit upstream of the throttle but downstream of the compressor may be used to infer boost pressure, whereas the pressure sensor (e.g. pressure sensor 115 at FIG. 1) positioned in the intake manifold may be relied upon for inferring manifold pressure.

Depicted at FIG. 4B is a first plot 455 and a second plot 460. A first area 465, defined as the area between first plot 455 and second plot 460, comprises part of the graph 450 where purge flow from the evaporative emissions system (and in some examples fuel system as well) is routed to the engine along both the vacuum path and the boost path. Thus, first area 465 may be referred to as the dual-path area of graph 450. A second area 470 bordered by the x-axis and first plot 455 defines part of graph 450 where purge flow from the evaporative emissions system (and in some examples fuel system as well) is routed to the engine along the boost path and not along the vacuum path. A third area 475 bordered by the second plot 460 and the y-axis defines part of graph 450 where purge flow from the evaporative emissions system (and in some examples fuel system as well) is routed to the engine along the vacuum path and not along the boost path.

Thus, from graph 450 it may be understood that it may be possible in some examples to control one or more engine system actuator(s) to bias the purge flow to the dual-path, under conditions where a vapor slug is inferred while fuel vapors are being routed along a single path. Again, biasing the purge flow to the dual-path may distribute the fuel vapors in time such that a chance for engine hesitation and/or stall is reduced or avoided. Briefly, in a case where a purging operation is being conducted and boost pressure and intake manifold pressure are such that fuel vapors are being routed along the vacuum path as defined by the third area 475, in response to an indication of a vapor slug event, one or more engine system actuators may be controlled to reduce an amount of intake manifold vacuum and/or increase boost pressure to bias the purge flow to the dual path as defined by first area 465 rather than the vacuum path alone. In another case where a purging operation is being conducted and boost pressure and intake manifold pressure is such that fuel vapors are being routed along the boost path as defined by the second area 470, in response to an indication of a vapor slug event, one or more engine system actuator(s) may be controlled to increase the amount of intake manifold vacuum and/or reduce boost pressure to bias purge flow to the dual path as defined by the first area 465 of graph 450.

Turning now to FIG. 5, a high-level example method 500 for conducting canister purging operations, and taking mitigating action in response to a vapor-slug event being inferred, is shown. Specifically, method 500 may be used to control one or more engine system actuators in a manner that enables canister purging to be maintained without being discontinued under circumstances where a vapor-slug event is inferred during canister purging. By maintaining canister purging rather than discontinuing the purging operation, the canister may be more effectively cleaned, which may reduce release of undesired evaporative emissions to atmosphere, may improve canister lifetime, and may improve engine operation and lifetime. Furthermore, the mitigating action taken in response to a vapor slug event being inferred may reduce opportunity for, or may altogether avoid, issues such as engine hesitation and/or stall which may otherwise occur in response to the vapor slug event.

Method 500 will be described with reference to the systems described herein and shown in FIGS. 1-3, though it will be appreciated that similar methods may be applied to other systems without departing from the scope of this disclosure. Instructions for carrying out method 500 and the rest of the methods included herein may be executed by a controller, such as controller 166 of FIG. 1, based on instructions stored in non-transitory memory, and in conjunction with signals received from sensors of the engine system, such as temperature sensors, pressure sensors, and other sensors described in FIGS. 1-3. The controller may employ actuators such as VBV (e.g. VBV 191 at FIG. 1), CVV (e.g. CVV 172 at FIG. 1), CPV (e.g. CPV 158 at FIG. 1), throttle (e.g. throttle 114 at FIG. 1), wastegate valve (e.g. wastegate valve 127 at FIG. 1), transmission (e.g. transmission 197 at FIG. 1), TiVCT actuators (e.g. first oil pressure-controlled actuator 283 and/or second oil pressure-controlled actuator 284 at FIG. 1), compressor bypass valve (e.g. compressor bypass valve 181 at FIG. 1), etc., to alter states of devices in the physical world according to the methods depicted below.

Method 500 begins at 505 and may include estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 510, method 500 includes indicating whether conditions are met for conducting a canister purging operation. Conditions being met at 510 may include an intake manifold vacuum greater than (e.g. more negative than) a predetermined threshold vacuum, or a boost pressure (e.g. TIP) greater than (e.g. more positive than) a predetermined threshold positive pressure. Conditions being met at 510 may additionally or alternatively include an indication that a canister loading state is greater than a predetermined threshold load (e.g. 40% loaded, 50% loaded, 60% loaded, 70% loaded, etc.). Conditions being met at 510 may include an indication that the engine is in operation, combusting air and fuel. If, at 510, conditions for conducting a canister purging operation are not met, method 500 may proceed to 515. At 515, method 500 may include maintaining current vehicle operating status without initiating a canister purging operation. For example, if the engine is operating to propel the vehicle, such action may be maintained. If the vehicle is being propelled, at least in part, via the motor, then such operation may be maintained. A current status or operational state of various valves (e.g. VBV, CVV, CPV, etc.) may be maintained. Method 500 may then end.

Returning to 510, in response to conditions being indicated to be met for conducting the canister purging operation, method 500 may proceed to 520, where purging of the canister may commence. While not explicitly illustrated, as discussed above it may be understood that purging the canister may include controlling a duty cycle of the CPV to a first or initial duty cycle, and then ramping up the CPV duty cycle over time as a function of a learned concentration of fuel vapors being inducted to the engine. Furthermore, while not explicitly illustrated it may be understood that conducting the canister purging operation may include commanding open or maintaining open the CVV, and may in some examples include commanding open the VBV although in other examples the VBV may be commanded or maintained closed without departing from the scope of this disclosure.

More specifically, purging the canister at 520 may include indicating an air/fuel ratio via, for example, a proportional plus integral feedback controller coupled to a two-state exhaust gas oxygen sensor, and responsive to the air/fuel indication and a measurement of inducted air flow, generating a base fuel command. To compensate for purge vapors, a reference air/fuel ratio, related to engine operation without purging, may be subtracted from the air/fuel ratio indication and the resulting error signal (compensation factor) generated. As such, the compensation factor may represent a learned value directly related to fuel vapor concentration, and may be subtracted from the base fuel command to correct for the induction of fuel vapors. The duration of the purging operation may be based on the learned value (or compensation factor) of the vapors such that when it is indicated there are no appreciable hydrocarbons in the vapors (the compensation is essentially zero), the purge may be ended.

Accordingly, at 522, method 500 includes learning the vapor concentration being inducted to the engine over time. As discussed above, learning the fuel vapor concentration may involve monitoring output of the exhaust gas oxygen sensor, where said output may be relied upon for learning the fuel vapor concentration entering the engine from the evaporative emissions system. Additionally or alternatively, output from the canister temperature sensor (e.g. temperature sensor 157 at FIG. 1) may be monitored and may be relied upon for learning the concentration of fuel vapors entering the engine.

At 524, method 500 includes controlling the CPV duty cycle based on the learned fuel vapor concentration. As discussed above at FIG. 4A, by controlling the duty cycle of the CPV based on the learned fuel vapor concentration, purge flow rate may be step-wise increased over time such that issues related to engine hesitation and/or stall may be avoided. However, as discussed, one example where the ramping up of the duty cycle over time may not address issues related to engine stability may include a sudden unexpected vapor slug event where fuel vapors generated in the fuel tank are routed to engine as unmetered fuel vapors.

Accordingly, proceeding to 525, method 500 includes indicating whether a vapor slug event is inferred. Inferring a vapor slug event may in one example include a fuel tank pressure increase greater than a threshold fuel tank pressure increase, or a rate of a fuel tank pressure increase greater than a threshold fuel tank pressure rise rate. Inferring the vapor slug event may additionally or alternatively include an indication of an unexpected acceleration or deceleration event, for example an acceleration or deceleration event not predicted by the controller based on throttle position, brake pedal position, accelerator pedal position, etc. As an example, a sudden unexpected amount of fuel vapor being combusted by the engine could result in acceleration not predicted by the controller. Alternatively, if the fuel vapor amount is such that degraded engine operating conditions result (e.g. some amount of hesitation), then unexpected deceleration may occur.

In the case where a vapor slug event is not inferred, method 500 may proceed to 530. At 530, method 500 may include indicating whether canister load is substantially clean, or in other words, less than a threshold canister load. In such an example, a canister being substantially clean, may comprise a canister loaded to less than 5% of its capacity with fuel vapors, or loaded to less than 2% of its capacity with fuel vapors. If, at 530, canister load is not less than the threshold, method 500 may return to 520 where canister purging may continue as discussed above. Alternatively, in response to canister load being indicated to be less than the threshold canister load, method 500 may proceed to 535. At 535, method 500 may include discontinuing purging of the canister. Discontinuing purging may include commanding the CPV closed. In some examples where the VBV was commanded open, discontinuing purging may include commanding closed the VBV.

Proceeding to 540, method 500 may include updating vehicle operating parameters. For example, updating vehicle operating parameters may include updating the canister loading state to reflect the recent purging event. Method 500 may then end.

Returning to 525, responsive to an indication of a vapor slug event, method 500 may proceed to 545. At 545, method 500 includes determining whether purge flow can be biased to the dual-path purge flow scenario (e.g. purge flow along the vacuum purge path and the boost purge path simultaneously), from the route whereby purge vapors are currently being routed. In other words, at 545, method 500 includes determining if purge flow can be biased to the dual-path purge flow instead of routing all of the purge flow through the vacuum path, or all of the purge flow through the boost path. How such an assessment may be determined is discussed in detail below. It may be understood that in one example, in a case where purge flow is already being routed to the engine via the dual-path, method 500 may proceed to 535 where purging may be discontinued as discussed above. In other words, because the purge flow is already being routed to the engine via both the boost path and the vacuum path, purging may be discontinued in order to avoid engine hesitation and/or stall issues. In such a case, updating conditions at 540 may include storing the results of the purging operation at the controller including an indication that the purging event was stopped due to the vapor slug event and because the purging was already being conducted via the dual-path scenario. In such an example, the current loading state of the canister may be stored at the controller, and a canister purge schedule may be updated so as to reinitiate the canister purging operation at the next possible opportunity for doing so. Method 500 may then end.

Returning to 545, in a case where fuel vapors are being purged to engine intake via one of the vacuum path or the boost path, and where a vapor slug event is inferred (refer to step 525), method 500 ascertains whether purge flow can be biased to the dual-path where fuel vapors are routed to engine intake via both the vacuum path and the purge path simultaneously. As discussed above, the present disclosure pertains to non-autonomous vehicles as well as autonomous vehicles, and the methodology for determining whether the purge flow can be biased to the dual-path may be slightly different depending on whether the vehicle is a non-autonomous vehicle or an autonomous vehicle. Briefly, for a non-autonomous vehicle, determining whether the purge flow can be biased to the dual-path may include determining whether intake manifold vacuum can be adjusted and/or whether boost pressure may be adjusted to bias the purge flow to the dual-path, in a manner that does not include the controller commanding adjustments to the throttle. In other words, for a non-autonomous vehicle, determining whether intake manifold vacuum and/or boost pressure can be adjusted so purging occurs via the dual-path includes determining if one or more engine system actuators can be used to adjust intake manifold vacuum and/or boost pressure in a manner that results in purge flow being routed through both the boost path and the vacuum path simultaneously, without significantly increasing or decreasing vehicle speed or significantly increasing or decreasing engine torque. For example, a non-autonomous vehicle may not be equipped with navigation sensors sufficient for determining whether vehicle speed can be increased or decreased in order to bias the purge flow to the dual-path, and additionally any increase or decrease in vehicle speed and/or engine torque increase or decrease may be non-intuitive to a driver of such a vehicle. Alternatively, as will be elaborated in further detail below, if the vehicle is an autonomous vehicle then navigational sensors may in some examples be used to determine whether vehicle speed and/or engine torque can be increased or decreased to bias the purge flow to the dual-path.

Accordingly, at 545 method 500 determines whether the vehicle is a non-autonomous vehicle or an autonomous vehicle. For example, a controller that is capable of receiving instructions from an autonomous controller may thereby determine that the vehicle is an autonomous vehicle. Alternatively, if the controller is not capable of receiving any instructions from an autonomous controller, or in other words, if the particular vehicle lacks the autonomous controller, then the controller may determine that the vehicle is a non-autonomous vehicle. In the case where the controller determines the vehicle is a non-autonomous vehicle, the controller may assess whether the intake manifold vacuum and/or boost pressure can be increased or decreased to a point where purge flow is via the dual-path (e.g. first area 465 of graph 450 depicted at FIG. 4B). For example, in a case where the purge flow is currently being routed to engine intake via the boost path and not the vacuum path, the controller may assess whether intake manifold vacuum can be increased (e.g. made more negative with respect to atmospheric pressure) such that the purge flow is biased to the dual-path. Alternatively, in a case where the purge flow is currently being routed to engine intake via the vacuum path and not the boost path, the controller may assess whether intake manifold vacuum can be decreased (e.g. made less negative with respect to atmospheric pressure).

More specifically, for a non-autonomous vehicle, determining whether intake manifold vacuum and/or boost pressure can be adjusted to bias the purge flow to the dual-path may include determining if adjusting transmission gearing and/or adjusting cam timing may be sufficient to biases the purge flow to the dual-path. As one example, adjusting the transmission gear may include the controller commanding the transmission to a next highest gear, or a next lowest gear, as compared to the gear the transmission is current using. For example if the vehicle is being propelled in third gear, the controller may assess whether adjusting the transmission to the second gear, or to the fourth gear, may be sufficient to bias the purge flow to the dual-path. In some examples, the methodology may not be limited to a next highest or lowest gear, but may include an adjustment to any higher gear or any lower gear with respect to the current gear that is being used to propel the vehicle. Accordingly, the controller may determine whether adjusting transmission gear may result in a change to make the ratio of boost pressure to intake manifold pressure such that fuel vapors are purged to engine intake via both the vacuum path and the boost path simultaneously. Determining the amount of intake manifold vacuum, for example, that has to be added or subtracted to bias the purge flow to the dual-path may include the controller querying a lookup table stored at the controller that stores information pertaining to purge path as a function of boost pressure and intake manifold vacuum, similar to the information represented by the graph depicted at FIG. 4B. With such an amount determined, determining whether adjusting the transmission gear can bias the purge flow to the dual-path may include taking into account the determined amount of intake manifold vacuum that has to be added or subtracted, along with current vehicle speed, current boost pressure (e.g. TIP), current intake manifold vacuum, current amount of driver-requested engine torque, current and target transmission gear, etc. As an example, the controller may include an algorithm that takes into account such variables as inputs to the algorithm and outputs a result pertaining to whether transmission gearing adjustments can be used to bias the purge flow to the dual-path without increasing or decreasing vehicle speed more than a threshold vehicle speed change. For example, for a given vehicle speed, transmission gear, boost pressure, and intake manifold vacuum there may be a threshold intake manifold vacuum change that can be realized by changing transmission gearing while avoiding a vehicle speed change greater than the threshold vehicle speed change. If the threshold intake manifold vacuum change is less than the determined amount of intake manifold vacuum change determined to be needed for biasing the purge flow to the dual-path, then it may be determined that adjusting the transmission gearing alone may not be sufficient to bias the purge flow to the dual-path without changing vehicle speed by more than the threshold vehicle speed change. Alternatively, if the threshold intake manifold vacuum change is greater than the determined amount of intake manifold vacuum change determined to be needed for biasing the purge flow to the dual-path, then it may be determined that adjusting transmission gearing alone may be sufficient for biasing the purge flow to the dual-path.

As discussed above, the controller may similarly determine how much intake manifold vacuum can be increased or decreased by making adjustments to cam timing, for example via adjusting actuators of an engine that includes twin independent variable cam timing (TiVCT) capabilities, such as that discussed with regard to FIG. 2 above. Similar to that discussed with regard to making adjustments to transmission gearing, the controller may determine how much intake manifold vacuum has to be increased or decreased to bias the purge flow to the dual-path, and may further determine the threshold intake manifold vacuum change that may be realized by adjusting cam timing without changing vehicle speed by more than the threshold speed change. If the threshold intake manifold vacuum change that can be realized by adjusting cam timing is less than the determined amount of intake manifold vacuum change that may result in the purge flow being biased to the dual-path, then the controller may determine that adjusting TiVCT alone may not be sufficient to bias the purge flow to the dual-path. Alternatively, in a case where the threshold intake manifold vacuum change is greater than the determined amount of intake manifold vacuum change that may result in the purge flow being biased to the dual-path, then the controller may determine that adjusting TiVCT may be sufficient for biasing the purge flow to the dual-path. It may be understood that adjusting TiVCT may include regulating rotation of one or more of the intake camshaft (e.g. intake camshaft 281 at FIG. 2) and the exhaust camshaft (e.g. exhaust camshaft 282 at FIG. 2). More specifically, regulating rotation of the intake camshaft may include the controller controlling an oil flow to the first oil pressure-controlled actuator (e.g. first actuator 283 at FIG. 2) and/or the second oil pressure-controlled actuator (e.g. second actuator 284 at FIG. 2). An amount and/or rate of oil flow provided to one or more of the first oil pressure-controlled actuator and/or the second oil pressure-controlled actuator may be determined by the controller as a function of the amount of intake manifold vacuum change desired to bias the purge flow to the dual-path.

In a case where either adjusting transmission gearing alone or adjusting TiVCT alone is determined to not be sufficient for biasing the purge flow to the dual-path, it may be understood that the controller may assess whether a combination of adjusting transmission gearing and adjusting TiVCT may be sufficient for biasing the purge flow to the dual-path. In other words, the controller may determine the threshold amount of intake manifold vacuum change that may be realized by adjusting the transmission gearing, and may similarly determine another threshold amount of intake manifold vacuum change that may be realized by adjusting TiVCT, and may sum the two threshold vacuum changes to determine if combining a transmission gearing change with adjusting TiVCT may be sufficient to bias the purge flow to the dual-path without changing vehicle speed by more than the threshold speed change.

Furthermore, in some examples where the vehicle is a non-autonomous vehicle there may be an option to slightly adjust boost pressure in a manner that does not cause the vehicle speed to change by more than the threshold speed change, while also relying on one or more of adjustments to TiVCT and/or transmission gearing to bias the purge flow to the dual-path. For example, in some examples where the purge flow is via the vacuum path and not the boost path, it may be desirable to slightly increase boost pressure while adjusting one or more of transmission gearing and/or TiVCT to bias the purge flow to the dual-path. In other examples where the purge flow is via the boost path and not the vacuum path, it may be desirable to slightly decrease boost pressure while adjusting one or more of transmission gearing and/or TiVCT to bias the purge flow to the dual-path. However, as mentioned, it may be understood that any such changes to boost pressure may have to be such that vehicle speed does not change by more than the threshold speed change. In such examples, adjusting boost pressure may include one or more of adjusting a duty cycle of the compressor bypass valve (e.g. compressor bypass valve 181 at FIG. 1) and adjusting a duty cycle of the wastegate valve (e.g. wastegate valve 127 at FIG. 1).

In the case of an autonomous vehicle, similar methodology as that discussed above may apply, with additional considerations. Specifically, for a non-autonomous vehicle as discussed above, any adjustments made to bias the purge flow to the dual-path may have to be such that vehicle speed does not change by more than the threshold speed change. However, for an autonomous vehicle, there may be an option to adjust vehicle speed in order to bias the purge flow to the dual-path, since an autonomous vehicle can rely on navigational sensors to determine whether or not it may be possible to increase or decrease vehicle speed in order to adjust one or more of intake manifold vacuum and boost pressure to bias purge flow to the dual-path. Furthermore, because the autonomous vehicle is not operated by a driver, any non-intuitive nature of vehicle acceleration and/or deceleration may not be an issue. Thus, it may be understood that for an autonomous vehicle, the controller may first assess whether similar adjustments as discussed above with regard to non-autonomous vehicles may be relied upon for biasing the purge flow to the dual-path. Briefly, first priority adjustments for autonomously operated vehicles may include adjustments that may bias the purge flow to the dual-path without changing vehicle speed by more than the threshold speed. In a case where such adjustments are determined via the controller to be capable of biasing the purge flow to the dual-path, then such adjustments may be carried out similar to that discussed above for non-autonomous vehicles.

However, in a case where it is determined that such adjustments are not sufficient to bias the purge flow to the dual-path, then the controller may next ascertain whether vehicle speed can be increased or decreased in a manner that may bias the purge flow to the dual-path. For example, the controller may retrieve navigation information from one or more of the autonomous driving sensors (e.g. sensors 320 at FIG. 3), to determine whether acceleration or deceleration of the vehicle to a level which may bias the purge flow to the dual-path is possible or not. For example, the controller may determine a target vehicle speed that may result in one or more of a change to intake manifold vacuum and boost pressure such that purge flow may be biased to the dual path. Then, relying on information provided to the controller from the autonomous driving sensors, the controller may assess whether it is possible to achieve the target vehicle speed. For example, the controller may retrieve information from one or more of the radar sensor, lidar sensor, camera, V2X communications, etc., for inferring whether a change in vehicle speed to the target vehicle speed is possible. Such a determination may be a function of current speed limits, current traffic conditions including how much space is in front of and/or in back of the vehicle, a difference between current vehicle speed and the target vehicle speed, whether a lane change may be used to achieve the target speed and whether a lane change is possible, etc.

If it is determined that it may be possible for the autonomous vehicle to achieve the target speed, then one or more subsystems of the autonomous vehicle may be controlled to achieve the target speed. Specifically one or more of the braking subsystem, the steering subsystem and the powertrain subsystem may be controlled to achieve the target speed. As a specific example, under circumstances where the purging is currently via the vacuum path and not the boost path, the controller of the autonomous vehicle may assess whether an acceleration event is permissable, and if so, the controller may rely on the lookup table or flow map that includes the information corresponding to the graph (e.g. graph 450 at FIG. 4B) of FIG. 4B to determine how much engine torque may be increased by to bias the purge flow to the dual-path. Based on such a determination, the controller may adjust a position of the electronically-controlled throttle (e.g. throttle 114 at FIG. 1) to a more open position to achieve the determined amount of engine torque corresponding to the target vehicle speed. It may be understood that in such an example, adjustments to TiVCT, boost pressure (e.g. by varying a duty cycle of the compressor bypass valve and/or wastegate valve), and/or transmission gearing may additionally be used to bias the purge flow to the dual-path. Such adjustments may in some examples allow for the amount of vehicle speed change to be lesser than would otherwise be if the TiVCT, boost pressure and/or transmission gearing adjustments were not additionally relied on.

As another specific example, under circumstances where the purging is currently via the boost path and not the vacuum path, the controller of the autonomous vehicle may assess whether a deceleration event is permissable, and if so, the controller may rely on the lookup table or flow map that includes the information corresponding to the graph of FIG. 4B to determine how much engine torque may be decreased by to bias the purge flow to the dual-path. Based on such a determination, the controller may adjust a position of the electronically-controlled throttle to a more closed position to achieve the determined amount of engine torque corresponding to the desired target speed of the vehicle. Similar to that discussed above, it may be understood that in such an example, adjustments to TiVCT, boost pressure and/or transmission gearing may additionally be used to bias the purge flow to the dual-path which may allow for the amount of vehicle speed change to be lesser than would otherwise be if the TiVCT, boost pressure and/or transmission gearing adjustments were not additionally relied on.

Thus, if at 545 it is determined that purge flow cannot be biased to the dual-path based on the above-discussed methodology (depending on whether the vehicle is an autonomous vehicle or a non-autonomous vehicle), method 500 may proceed to 535 where the purging operation may be discontinued similar to that described above. In such an example, updating vehicle operating parameters at 540 may include updating current loading state of the canister and may further include updating the canister purging schedule so as to reinitiate the canister purging operation at a next possible opportunity when conditions are met for doing so. Furthermore, information may be stored at the controller pertaining to why the purging operation was terminated, for learning purposes and/or for information providable to a technician. Method 500 may then end.

Returning to 545, in a case where it is determined that purge flow can be biased to the dual-path, method 500 may proceed to 550. At 550, method 500 may include controlling one or more vehicle actuators to bias the purge flow to the dual-path depending on the determination of how to bias the purge flow to the dual-path obtained at 545. As discussed above, such actuators may include one or more of TiVCT actuators (e.g. first oil-pressure controlled actuator 283 and second oil-pressure controlled actuator 284 of FIG. 2), electronically-controlled throttle (e.g. throttle 114 at FIG. 1), transmission gearing (e.g. transmission 197 at FIG. 1), wastegate valve (e.g. valve 127 at FIG. 1), compressor bypass valve (e.g. valve 181 at FIG. 1), etc.

While not explicitly illustrated, it may be understood that it is within the scope of the present disclosure to control the one or more actuators such that, as much as possible, a ratio of fuel vapors traveling through the vacuum path and the boost path are substantially similar in amount. For example, in this particular instance, substantially similar may pertain to the ratio being within 10% of each other, within 20% of each other, etc., in terms of amount or concentration. In other examples, it may be desirable to control the ratio to ratios that are not substantially similar. Returning to the graph depicted at FIG. 4B, it may be understood that with purge flow in the first area (e.g. first area 465 at FIG. 4B), but closer to the first plot (e.g. first plot 455 at FIG. 4B) than to the second plot (e.g. second plot 460 at FIG. 4B), a greater proportion of fuel vapors may flow through the boost path than the vacuum path. Alternatively, with purge flow in the first area of FIG. 4B but closer to the second plot than the first plot, a greater proportion of fuel vapors may flow through the vacuum path than the vacuum path. Thus, the controller may rely on the flow map that includes the information depicted at FIG. 4B for controlling the purge flow to a desired ratio of fuel vapors spread out between the vacuum path and the boost path, in some examples. As an example, it may be desirable to route a greater proportion of fuel vapors through the boost path than the vacuum path, since the boost path has a longer time delay than the vacuum path. Such action may decrease opportunity for engine hesitation and/or stall in some examples.

With the one or more actuators controlled at 550 to bias the purge flow to the dual-path, method 500 may return to 520, where purging of the canister may be continued. While not explicitly illustrated, in some examples it may be understood that at 525, in response to the vapor slug event no longer being indicated, method 500 may, where possible, control the one or more actuators in a manner such that the purging is once again controlled to the initial path (e.g. vacuum path or boost path) for which the canister was initially being purged via, prior to the biasing of the purge flow to the dual-path. In doing so, then in response to another subsequent vapor slug event being inferred similar methodology as that discussed above may be used to bias the purge flow to the dual-path. If the purge flow were not returned to the initial flow path, then it may not be possible to bias the purge flow to the dual-path in response to subsequent vapor slug events, and instead the purging event may undesirably have to be discontinued. However, in other examples once the purge flow is biased to the dual-path then the purging may continue via the dual-path and may not be controlled to the initial single-path, without departing from the scope of this disclosure.

Accordingly, in response to the purge flow being biased to the dual-path at 550, purging of the canister may continue as discussed above with regard to method 500, until canister load is lower than the threshold canister load. Once below the canister load as determined by step 530, method 500 may proceed to 535 as discussed which may include discontinuing purging by commanding closed the CPV. At 540, updating vehicle operating conditions may include updating canister loading state as a function of the purging operation, and may include storing relevant information at the controller pertaining to which actuators were controlled to bias the purge flow to the dual-path, the circumstances that led to the vapor slug event, etc. Method 500 may then end.

Turning now to FIG. 6, an example timeline 600 is shown for taking mitigating action during a canister purging operation in response to a vapor slug event such that the purging operation may continue without having to be aborted. It may be understood that the example timeline 600 relates to a non-autonomously operated vehicle, in other words the vehicle used for timeline 600 is operated by a driver. Timeline 600 includes plot 605, indicating whether conditions are met for conducting a canister purging operation (yes or no), over time. Timeline 600 further includes plot 610, indicating which purge path fuel vapors are being routed to the engine by, over time. Fuel vapors may be routed by way of the boost path, the vacuum path, or both (DP, or dual-path). Timeline 600 further includes plot 615, indicating purge flow rate, over time. Similar to that discussed above with regard to FIG. 4A, it may be understood that purge flow rate increases along the y-axis (refer to inset 601), in the direction of the arrow depicted on the y-axis for plot 615. Timeline 600 further includes plot 620, indicating pressure in the fuel system as monitored by the FTPT (e.g. FTPT 191 at FIG. 1), over time. Pressure in the fuel system may be greater (+) or lesser (−), or in other words more positive (+) or less positive (−) over time. While it is recognized that fuel tank pressure may in some examples be negative with respect to atmospheric pressure, in this example timeline it may be understood that fuel tank pressure is always positive with respect to atmospheric pressure.

Timeline 600 further includes plot 625, indicating throttle inlet pressure (TIP), over time. Similar to that discussed above for plot 620, TIP may be greater (+) or lesser (−), over time, where all throttle inlet pressures corresponding to timeline 600 are positive with respect to atmospheric pressure. TIP may be monitored by a pressure sensor upstream of the throttle (e.g. pressure sensor 117 at FIG. 1). Timeline 600 further includes plot 630, indicating intake manifold pressure, over time. Intake manifold pressure may be at atmospheric pressure or may be less than (−) atmospheric pressure, or in other words, more negative than atmospheric pressure. Timeline 600 further includes plot 635, indicating vehicle speed (miles per hour), over time. The vehicle may be either stopped, or may be traveling in a forward direction at a speed greater than (+) stopped. Timeline 600 further includes plot 640, indicating throttle position, over time. The throttle may be fully open, fully closed, or somewhere in between. Timeline 600 further includes plot 645, indicating whether engine hesitation and/or stall is inferred (yes or no), over time.

At time t0, purging conditions are met (plot 605), and the purging of the canister is already being conducted via the boost path (plot 610) and not the vacuum path. Purge flow rate is relatively low, indicative of the CPV being duty cycled at a relatively low duty cycle (e.g. 10% duty cycle). In this example timeline 600, while not explicitly illustrated, it may be understood that the VBV (e.g. VBV 191 at FIG. 1) is in a closed configuration but where the VBV includes a notch that enables fuel vapors to travel from the fuel tank to the evaporative emissions system. In other words, a sudden fuel slosh event that generates fuel vapors may result in the fuel vapors being communicated to the evaporative emissions system, rather than being confined to the fuel tank. At time t0, fuel tank pressure is relatively low (plot 620), TIP is at a certain pressure (plot 625) as measured by the pressure sensor (e.g. pressure sensor 117 at FIG. 1) upstream of the throttle and intake manifold pressure is at another certain pressure (plot 630) as measured by the manifold air pressure (MAP) sensor (e.g. pressure sensor 115 at FIG. 1). While exact values for TIP and MAP are not provided, it may be understood that TIP pressure and MAP values are such that purge flow is via the boost path (plot 610) (refer to second area 470 of graph 450 at FIG. 4B). The vehicle is traveling at a particular speed (plot 635) requested by the vehicle operator controlling throttle position (plot 640) by way of the accelerator pedal. At time t0, engine hesitation and/or stall is not indicated (plot 645).

Between time t0 and t1, a vapor slug event is not inferred, as vehicle speed is maintained in line with the requested vehicle speed as indicated via throttle position, and fuel tank pressure does not change substantially. While not explicitly illustrated, it may be understood that between time t0 and t1, a concentration of fuel vapors being inducted to the engine is learned, and based on the learned concentration, duty cycle of the CPV is adjusted accordingly so as to increase the purge flow rate over time. Accordingly, between time t0 and t1, purge flow rate increases in a step-wise fashion, where each step up in purge flow rate may be understood to comprise an increase in CPV duty cycle.

However, at time t2, pressure in the fuel system begins rising. While not explicitly illustrated, it may be understood that the rise in fuel system pressure in this example timeline is due to a fuel slosh event that generates fuel vapors and thereby results in the fuel system pressure rise. At time t2, pressure in the fuel system rises above a pressure rise increase threshold represented by line 621. Accordingly, at time t2 a vapor slug event is inferred based on the fuel system pressure rise. If the vapors generated due to the fuel slosh event were all routed to the engine via the current boost path, then engine hesitation and/or stall may result. However, by taking mitigating action to distribute the fuel vapors along both the boost path and the vacuum path, an effective amount of fuel vapors reaching the engine at any one time may be reduced, which may reduce opportunity for engine hesitation and/or stall.

Accordingly, because the vehicle discussed with regard to example timeline 600 is a non-autonomous vehicle, in response to the vapor slug event being inferred control methodology may assess whether it may be possible to adjust the TiVCT and/or control the transmission in a manner such that intake manifold vacuum can be increased (e.g made more negative with respect to atmospheric pressure) to a level where purging is via the dual-path (e.g. vacuum path and boost path simultaneously), without changing vehicle speed by more than the threshold vehicle speed change. Accordingly, relying on the flow map that includes information pertaining to purge flow path as a function of boost pressure and intake manifold pressure (e.g. similar to graph 450 at FIG. 4B), the controller of the vehicle determines the amount of intake manifold vacuum increase to bias the purge flow to the dual-path. In this example timeline, the amount is represented by line 631. Next, the controller determines an amount whereby intake manifold vacuum may be increased. In this example timeline it may be understood that the controller determines that TiVCT adjustments can be used to increase intake manifold vacuum by the amount represented by line 632, where such adjustments may not result in a change to vehicle speed greater than the threshold speed change. Because the amount of intake manifold vacuum increase possible via TiVCT adjustments (line 632) is greater than the amount of intake manifold vacuum increase that biases the purge flow to the dual path (line 631), it is possible to switch the purge flow route to the dual path via the TiVCT adjustments.

Accordingly, just after time t2, the controller adjusts the TiVCT in a manner that increases the intake manifold vacuum (plot 630). At time t3, the intake manifold vacuum for which the purge path is switched to the dual-path is achieved (plot 630 with reference to line 631), and accordingly at time t3 the purge flow switches from the boost path to the dual-path (plot 610).

Between time t3 and t4, fuel system pressure (plot 620) remains greater than the threshold pressure (line 621), but because the purge flow has been switched to the dual-path, issues pertaining to engine hesitation and/or stall are avoided (plot 645). Furthermore, the result of avoiding engine hesitation and/or stall occurred without a change in vehicle speed (plot 635) greater than the threshold speed change (represented by line 636). Importantly, by switching the purge flow to the dual-path, purging of the canister continues uninterrupted. While depicted between time t3 and t4 is a purge flow rate corresponding to a CPV duty cycle increase, in other examples it may be understood that in response to the purge flow being switched purposefully to the dual-path due to a vapor slug event, duty cycle increases may be prevented until the vapor slug event is no longer indicated.

At time t4, fuel system pressure drops below the threshold pressure, and accordingly, shortly after time t4 the vehicle controller again adjusts the TiVCT in a manner so as to purge the fuel vapors from the evaporative emissions system via the boost path instead of the dual-path. Thus, by time t5 the intake manifold pressure is returned to the level prior to the vapor slug event via the TiVCT adjustments. After time t5, purging continues without any further vapor slug events being inferred.

Thus, example timeline 600 depicts an example case where TiVCT adjustments for a non-autonomous vehicle are used in response to a vapor slug event to increase intake manifold vacuum to a level such that purge flow is switched from the boost path to the dual-path, in a manner whereby vehicle speed does not change by more than the threshold speed change. While not shown, it may be understood that similar methodology may be used under conditions where purging is via the vacuum path, and where in order to mitigate a vapor slug event, intake manifold vacuum has to be decreased (e.g. made less negative with respect to atmospheric pressure) to bias the purge flow to the dual-path. However, in such cases, if it is determined that it is not possible to bias the purge flow to the dual-path without altering vehicle speed, then purging may be undesirably discontinued. Thus, an advantage to an autonomous vehicle is that vehicle speed may be altered where it is determined possible to do so, in order to bias the purge flow to the dual-path under circumstances where simply controlling TiVCT and/or transmission gearing is not sufficient.

Accordingly, turning now to FIG. 7, another example timeline 700 is shown for taking mitigating action during a canister purging operation in response to a vapor slug event such that the purging operation may continue without having to be aborted. It may be understood that the example timeline 600 relates to an autonomously operated vehicle, in other words the vehicle used for timeline 600 is not operated by a driver but rather via a system such as the system depicted at FIG. 3. Timeline 700 includes plot 705, indicating whether purging conditions are met (yes or no), over time. Timeline 700 further includes plot 710, indicating whether the fuel vapors are being routed from the evaporative emissions system to the engine via the vacuum path, the boost path, or the dual path (DP) that includes both the vacuum path and the boost path simultaneously, over time. Timeline 700 further includes plot 715, indicating purge flow rate, over time. Similar to that discussed at FIG. 4A, purge flow rate increases along the y-axis (refer to inset 701), and increases in the direction of the y-axis arrow for plot 715.

Timeline 700 further includes plot 720, indicating fuel system pressure, over time. Pressure in the fuel system may be greater (+) or lesser (−), or in other words more positive (+) or less positive (−) over time. While it is recognized that fuel tank pressure may in some examples be negative with respect to atmospheric pressure, in this example timeline it may be understood that fuel tank pressure is always positive with respect to atmospheric pressure. Timeline 700 further includes plot 725, indicating throttle inlet pressure (TIP), over time. Similar to that discussed above for plot 720, TIP may be greater (+) or lesser (−), over time, where all throttle inlet pressures corresponding to timeline 700 are positive with respect to atmospheric pressure. TIP may be monitored by a pressure sensor upstream of the throttle (e.g. pressure sensor 117 at FIG. 1). Timeline 700 further includes plot 730, indicating intake manifold pressure, over time. Intake manifold pressure may be at atmospheric pressure or may be less than (−) atmospheric pressure, or in other words, more negative than atmospheric pressure. Timeline 700 further includes plot 735, indicating vehicle speed (miles per hour), over time. The vehicle may be either stopped, or may be traveling in a forward direction at a speed greater than (+) stopped. Timeline 700 further includes plot 740, indicating throttle position, over time. The throttle may be fully open, fully closed, or somewhere in between. Timeline 700 further includes plot 745, indicating whether engine hesitation and/or stall is inferred (yes or no), over time.

At time t0, purging conditions are met (plot 705), and fuel vapors are being routed from the evaporative emissions system to engine intake along the vacuum path and not the boost path (plot 710). Purge flow rate is relatively low (plot 715), and fuel tank pressure is relatively low (plot 720). Throttle inlet pressure (TIP) is on the lower end (plot 725), while there is a relatively large intake manifold vacuum (plot 730) as compared to atmospheric pressure. Thus, based on the intake manifold vacuum and TIP, it may be understood that boost pressure and intake manifold pressure is such that purge flow is via the vacuum path as defined by the third area (e.g. third area 475 of FIG. 4B) of the flow map of FIG. 4B. At time t0, the vehicle is traveling at a particular speed (plot 735), based on commands from the autonomous controller including throttle position (plot 740). As of time t0 there are no indications of engine hesitation and/or stall.

Between time t0 and t1, while not explicitly illustrated it may be understood that the controller learns the concentration of fuel vapors being inducted to the engine by way of the vacuum path, and commands step-wise increases in the CPV duty cycle so as to step-wise increase the purge flow rate (plot 715). Between time t0 and t1, there are no indications of a vapor slug event as fuel tank pressure remains fairly stable (plot 720). However, at time t1 fuel tank pressure begins to rise, and at time t2 fuel tank pressure crosses the pressure rise increase threshold represented by line 721, indicating a vapor slug event. In this example timeline 700 it may be understood that the vapor slug event is due to a fuel slosh event that results in fuel vapor generation in the fuel tank. While not explicitly illustrated, it may be understood that at time t2, responsive to the indication of the vapor slug event, the controller of the autonomous vehicle assess whether it is possible to bias the purge flow from the vacuum path to the dual-path, without adjusting vehicle speed, similar to that discussed above with regard to the timeline of FIG. 6. However, in this example timeline 700 it may be understood that the controller determines that the purge flow cannot be biased to the dual-path without increasing vehicle speed to a target speed, the target speed determined as a function of an amount by which intake manifold vacuum has to be decreased (e.g. made less negative) and/or an amount by which TIP has to be increased to bias the purge flow to the dual-path. In this example timeline 700, it may be understood that the amount whereby intake manifold vacuum can be decreased without adjusting vehicle speed is represented by line 731, whereas an amount that the intake manifold vacuum has to be decreased to bias the purge flow to the dual-path is represented by line 732. Because the amount that the intake manifold vacuum has to be decreased to for biasing the purge flow to the dual-path is greater than the amount that the vehicle can decrease the intake manifold vacuum by without changing vehicle speed by more than the threshold speed change, it is determined that a vehicle speed change has to occur to bias the purge flow to the dual-path.

Accordingly, just after time t2 the controller relies on one or more of the navigation sensors (e.g. sensors 320 at FIG. 3) to ascertain whether the vehicle can accelerate to reach the target speed. Such a determination may include determining how much space is in front of the vehicle and another vehicle, how fast the vehicle in front of the autonomous vehicle is traveling with respect to how fast the autonomous vehicle is traveling, whether a lane change can be made to allow for the vehicle to reach the target speed, or any other traffic-related circumstance which would impact the ability of the vehicle to reach the target speed. In this example timeline 700, it may be understood that based on information received from the navigational sensors at the controller, the controller determines that the target vehicle speed can be reached for mitigating the vapor slug event.

Accordingly, between time t2 and t3, the controller commences commanding the electronically-actuated throttle to a position that produces an engine torque for increasing vehicle speed to the target speed. Accordingly, in response to commencing controlling the throttle (plot 740), vehicle speed begins increasing (plot 735), and with the throttle commanded to a more open position, intake manifold pressure decreases (plot 730). Furthermore, boost pressure is slightly increased, thereby helping to bias the purge flow to the dual-path. While not explicitly illustrated, it may be understood that boost pressure in this example timeline is increased by decreasing a duty cycle of the wastegate valve (e.g. valve 127 at FIG. 1), although in other examples decreasing a duty cycle of the compressor bypass valve (e.g. valve 181 at FIG. 1) may achieve a similar result of increasing boost pressure.

At time t3, vehicle speed (plot 735) reaches the target vehicle speed represented by line 736. Vehicle speed reaching the target vehicle speed includes intake manifold pressure (plot 730) and TIP (plot 725) being such that the purge flow switches from the vacuum path to the dual-path (plot 710). With the purge flow being routed through both the vacuum path and the boost path, fuel vapors are separated in time by enough to avoid engine hesitation and/or stall issues (plot 745) related to the vapor slug event. Accordingly, between time t3 and t4, purging of the canister is maintained, and CPV duty cycle is increased once during the time frame between time t3 and t4. However, as discussed above with regard to the timeline of FIG. 6, in some examples any increases to CPV duty cycle may be prevented while mitigating action is being taken to avoid engine hesitation and/or stall due to the vapor slug event, without departing from the scope of this disclosure.

At time t4, pressure in the fuel tank drops below the threshold pressure (line 721), indicating that the vapor slug event is no longer an issue to contend with. Accordingly, after time t4 vehicle speed is commenced being controlled back to the vehicle speed the vehicle was traveling at prior to the vapor slug event. Of course, controlling vehicle speed back to the speed the vehicle was traveling at prior to the vapor slug event may include the autonomous vehicle controller receiving information from the navigation sensors, to determine whether it is possible to decrease the vehicle speed to the original vehicle speed prior to the vapor slug event. In this example timeline 700, it may be understood that the controller determines such a speed decrease is possible, and thus commands the throttle to commence being returned back to its original position prior to the vapor slug event (plot 740). As vehicle speed decreases as a function of throttle position, vacuum in the intake manifold (plot 730) similarly begins returning to the original vacuum level in the intake manifold prior to the vapor slug event. At time t5, manifold vacuum and TIP are such that the purging of the canister is once again via the vacuum path, and not via the dual-path (plot 710). After time t5, purging of the canister continues (plot 715), and fuel tank pressure (plot 720) is such that another vapor slug event is not inferred. Thus, by relying on navigation sensors included in an autonomous vehicle system, vehicle speed may be controlled so as to bias purge flow to the dual-path under conditions of a vapor slug event during purging and under conditions where simply controlling TiVCT and/or transmission gearing is not sufficient to bias the purge flow to the dual-path.

Thus, the timeline of FIG. 7 illustrates how purge flow can be biased to the dual-path by controlling vehicle speed, under conditions where intake manifold pressure and TIP cannot otherwise be controlled so as to bias the purge flow to the dual-path.

Thus, discussed herein, a method may comprise purging fuel vapors from a fuel vapor storage canister to an engine of a vehicle via a single path, and in response to an inferred increase in a concentration of the fuel vapors being purged to the engine via the single path, switching to purging the fuel vapors to the engine via two paths including the single path, simultaneously.

In such a method, a time frame between the fuel vapors exiting the fuel vapor storage canister and entering the engine may be different for each of the two paths.

In such a method, the single path may be one of a vacuum path where the fuel vapors are routed to the engine without passing through an intake throttle or a boost path where the fuel vapors are routed to the engine through the intake throttle. In such a method, the two paths may include both the vacuum path and the boost path.

In such a method, switching to purging the fuel vapors to the engine via the two paths simultaneously may further comprise adjusting one or more of an engine intake manifold vacuum and a throttle inlet pressure based on how much the engine intake manifold vacuum and/or throttle inlet pressure have to be increased or decreased by to switch the fuel vapors to be purged via the two paths simultaneously.

In such a method, switching to purging the fuel vapors to the engine via the two paths simultaneously may occur without changing vehicle speed by more than a threshold speed change.

In such a method the vehicle may be an autonomous vehicle and where switching to purging the fuel vapors to the engine via the two paths simultaneously includes accelerating or decelerating the vehicle.

In such a method, the method may further comprise indicating that the fuel vapors cannot be switched to being purged to the engine via the two paths simultaneously based on operating conditions of the engine, and responsive to an indication that the fuel vapors cannot be switched to being purged to the engine via the two paths simultaneously, discontinuing purging the fuel vapors to the engine.

In such a method, the inferred increase in the concentration of the fuel vapors may include a greater than threshold pressure increase in a fuel tank of the vehicle, or vehicle acceleration or deceleration that is independent of a position of an accelerator pedal.

In such a method, the method may further comprise controlling a duty cycle of a canister purge valve that regulates a flow rate of the fuel vapors being purged to the engine while the fuel vapors are being purged to the engine via the single path and via the two paths.

Another example of a method may comprise purging fuel vapors from a fuel vapor storage canister to an intake of an engine via one of a vacuum path or a boost path, and in response to an indication of imminent engine hesitation or stall, purging the fuel vapors from the fuel vapor storage canister to the engine via both the vacuum path and the boost path.

In such a method, purging the fuel vapors via the boost path may include routing the fuel vapors through an ejector system to an air intake system at a position upstream of a compressor and then to the engine, and purging the fuel vapors via the vacuum path may include routing the fuel vapors to the engine without the fuel vapors being routed through the ejector system to the air intake system at the position upstream of the compressor.

In such a method, the method may further comprise indicating imminent engine hesitation and/or stall responsive to one or more of a fuel tank pressure increase greater than a threshold increase and an acceleration or deceleration of the vehicle that is not related to a change in position of an accelerator pedal.

In such a method, purging the fuel vapors via both the vacuum path and the boost path may include adjusting one or more of an engine intake manifold vacuum and a throttle inlet pressure. Adjusting one or more of the engine intake manifold vacuum and the throttle inlet pressure may further include decreasing the engine intake manifold vacuum and/or increasing the throttle inlet pressure when the purging the fuel vapors is via the vacuum path and not the boost path in order to purge the fuel vapors via both the vacuum path and the boost path. Adjusting one or more of the engine intake manifold vacuum and the throttle inlet pressure may further include increasing the engine intake manifold vacuum and/or decreasing the throttle inlet pressure when the purging the fuel vapors is via the boost path and not the vacuum path in order to purge the fuel vapors via both the vacuum path and the boost path. Adjusting one or more of the engine intake manifold vacuum and the throttle inlet pressure may further comprise one or more of adjusting twin independent variable cam timing of the engine, changing a gear of a transmission of the vehicle, controlling a duty cycle of a compressor bypass valve, controlling a position of an intake throttle, and controlling a duty cycle of a turbine wastegate valve.

In such a method, a time duration between the fuel vapors exiting the fuel vapor storage canister and entering the engine may be longer along the boost path than the vacuum path. Purging the fuel vapors from the fuel vapor storage canister via both the vacuum path and the boost path may thus distribute the fuel vapors in time so that an effective concentration of fuel vapors reaching the engine at a particular time since the fuel vapors exit the fuel vapor storage canister is reduced.

It is herein recognized that purging the canister via the dual-path may in some examples be advantageous for allowing for the CPV duty cycle to be increased in a manner faster than the duty cycle may be otherwise increased if the purging was via a single path (e.g. the vacuum path and not the boost path or vice versa). Such action may be particularly advantageous for situations where it is desirable to learn canister load, such as after a refueling event that loads the canister to some extent or after a long soak (vehicle-off condition) where fuel vapors from the tank load the canister to some extent.

Accordingly, turning to FIG. 8, an example method 800 for learning a canister loading state at a key-on event is shown. Specifically, the method includes controlling a purge flow to be via the dual-path rather than a single path so as to allow for an increased ramp rate of the CPV duty cycle which may in turn enable faster learning of the canister loading state.

Method 800 will be described with reference to the systems described herein and shown in FIGS. 1-3, though it will be appreciated that similar methods may be applied to other systems without departing from the scope of this disclosure. Instructions for carrying out method 800 and the rest of the methods included herein may be executed by a controller, such as controller 166 of FIG. 1, based on instructions stored in non-transitory memory, and in conjunction with signals received from sensors of the engine system, such as temperature sensors, pressure sensors, and other sensors described in FIGS. 1-3. The controller may employ actuators such as VBV (e.g. VBV 191 at FIG. 1), CVV (e.g. CVV 172 at FIG. 1), CPV (e.g. CPV 158 at FIG. 1), throttle (e.g. throttle 114 at FIG. 1), wastegate valve (e.g. wastegate valve 127 at FIG. 1), transmission (e.g. transmission 197 at FIG. 1), TiVCT actuators (e.g. first oil pressure-controlled actuator 283 and/or second oil pressure-controlled actuator 284 at FIG. 1), compressor bypass valve (e.g. compressor bypass valve 181 at FIG. 1), etc., to alter states of devices in the physical world according to the methods depicted below.

Method 800 begins at 805 and may include estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, fuel tank pressure, etc., as well as various ambient conditions, such as ambient temperature, humidity, barometric pressure, etc.

Proceeding to 810, method 800 includes indicating whether conditions are met for learning a loading state of the fuel vapor storage canister. Conditions being met at 810 may include an indication of a key-on event (or other means of turning on the vehicle) following a refueling event where fuel has been added to the fuel tank. In another example, conditions being met at 810 may include a key-on event (or other means of turning on the vehicle) following a vehicle soak condition greater than a threshold duration under conditions where ambient temperature is greater than a threshold temperature. It may be understood that the threshold duration and the threshold temperature may be related to an amount of an expected increase in canister loading during the soak condition, for example. Conditions being met at 810 may include an indication that the engine is combusting air and fuel, and in some examples may include an indication that a temperature of an exhaust catalyst is greater than a threshold temperature (e.g. light-off temperature).

If, at 810, conditions are not indicated to be met for learning canister load, method 800 may proceed to 815. At 815, method 800 includes maintaining current vehicle operating status. For example, the current vehicle operating status may be maintained without initiating a canister load learning operation. Method 800 may then end.

Returning to 810, in response to conditions being indicated to be met for learning canister load, method 800 may proceed to 820. At 820, method 800 may include purging the fuel vapor storage canister via the dual-path, or in other words purging the canister in a manner such that fuel vapors are routed through both the vacuum path and the boost path simultaneously. As biasing the purge flow to the dual-path has been discussed in detail above, a detailed description is not again provided here. It may be understood that any of the above-discussed methodology may be used for biasing the purge flow to the dual-path.

It may be understood that similar to the purging operation discussed at 520, purging the canister at 820 may include learning a concentration of fuel vapors being routed to the engine, and may further include controlling duty cycle of the CPV as a function of the learned fuel vapor concentration. Because fuel vapors are being routed through the dual-path, the CPV duty cycle may be increased at a faster rate than if the fuel vapors were being routed through a single path (e.g. the vacuum path but not the boost path, or the boost path but not the vacuum path), while still avoiding issues pertaining to engine hesitation and/or engine stall. This may allow a faster determination as to canister load as compared to canister learning operations that rely on fuel vapors being purged through a single path. Similar to that discussed above, based on the learned concentration of fuel vapors being inducted to the engine, the controller may extrapolate an estimated canister load.

Accordingly, at 825, method 800 indicates whether canister load has been determined. If not, method 800 continues to purge the canister. However, in response to the canister load having been determined, method 800 may proceed to 835 where the canister load learning operation may be discontinued. Similar to that discussed above, discontinuing the canister purging operation may include commanding closed the CPV.

Proceeding to 835, method 800 includes updating vehicle operating parameters. Updating vehicle operating parameters may include storing the canister loading state at the controller, and scheduling a canister purging operation to occur at the next available opportunity. Method 800 may then end.

Thus, it may be understood that method 800 may be used under conditions where it is desirable to rapidly learn canister load, but where it may or may not additionally be desirable to purge the canister until the canister is substantially clean. In other words, method 800 may be used after conditions where considerable canister loading is predicted to have occurred (e.g. after a refueling event or after a long vehicle soak), such that a loading state of the canister is not known. By rapidly learning the canister loading state, a canister purging event may be scheduled for an appropriate time where it is inferred that the canister may be purged to a loading state less than a threshold loading state (e.g. 5% loaded, 2% loaded, etc.). For example, a non-autonomous and/or an autonomous vehicle may in some examples include route learning methodology, which may in some examples be used to predict when conditions will be such that a canister with a particular canister loading state can be purged until substantially clean (e.g. 5% loaded or less, 2% loaded or less, etc.). In the case of an autonomous vehicle, such a determination may additionally or alternatively be made based on input received from the navigational sensors.

Turning now to FIG. 9, an example timeline 900 for conducting a canister load learning operation, is shown. Timeline 900 includes plot 905, indicating whether conditions are met (yes or no) for learning a loading state of the canister, over time. Timeline 900 further includes plot 910, indicating whether fuel vapors being purged to engine intake are being routed through the vacuum path (and not the boost path), the boost path (and not the vacuum path) or via the dual-path (boost path and vacuum path simultaneously), over time. Timeline 900 further includes plot 915, indicating a purge flow rate, over time. For this example timeline 900, purge flow rate increases along the y-axis (refer to inset 901), in the direction of the arrow corresponding to the y-axis of plot 910. It may be understood that plot 915 corresponds to a circumstance where the canister is being purged via the dual-path. Timeline 900 further includes plot 918 depicted as a dashed line, indicating purge flow rate under circumstances where the canister is being purged via either the vacuum path or the boost path, but not the dual-path. Timeline 900 further includes plot 920, indicating whether engine hesitation and/or stall is indicated, over time. Timeline 900 further includes plot 925, indicating whether the canister loading state has been learned (yes or no), over time.

At time t0, conditions have been indicated to be met for learning canister load (plot 905). In other words, it may be understood that time t0 follows a refueling event where subsequent to the refueling event a key-on condition occurred. At time t0, the canister load learning operation has been initiated, and the canister is being purged via the dual-path (plot 910). Purge flow rate is at a particular rate (plot 915), which as discussed above is a function of CPV duty cycle. Engine hesitation and/or stall is not indicated (plot 920) and canister loading state has not yet been learned (plot 925).

Between time t0 and t1, it can be seen that the purge flow rate increases faster when purging is via the dual-path (plot 915), as compared to how fast the purge flow rate may increase if purging were to be via a single path (e.g. boost path or vacuum path but not both simultaneously). While not explicitly illustrated, it may be understood that between time t0 and t1, the step-wise increases are based on an estimate of fuel vapor concentration being inducted to the engine, where each step-wise increase corresponds to an increase in CPV duty cycle. The estimated or learned fuel vapor concentration may be used to estimate canister loading state, and accordingly, at time t1 canister loading state is indicated to have been learned (plot 925). Accordingly, conditions for learning canister loading state are no longer met at time t1, and purge flow rate is no longer possible to be determined because the CPV is commanded closed at time t1 (not shown). With the canister loading state learned, the controller may, after time t1, schedule a canister purging operation based on the learned canister loading state.

It is herein additionally recognized that the ability to control whether purge flow is via the boost path, the vacuum path, or the dual-path may in some examples be useful for purging the canister even under situations where there is degradation along one of the vacuum path or the boost path. For example, in a situation where the first check valve (e.g. CV1 153 of FIG. 1) is stuck closed such that purging cannot occur via the vacuum path, the methodology described herein may be used to control the purge flow to either the dual-path or the boost path such that purging can either commence or continue. In another example where the second check valve (e.g. CV2 170 of FIG. 1) is stuck closed such that purging cannot occur via the boost path, the methodology described herein may be used to control the purge flow to either the dual-path or to the vacuum path such that purging can commence or continue.

In this way, purging operations of a fuel vapor storage canister positioned in a vehicle evaporative emissions system may be made more efficient, by allowing for purging to continue under circumstances where, if the mitigating actions discussed herein were not taken, purging would have to be discontinued. By allowing purging operations to continue rather than be discontinued, opportunity for release of undesired evaporative emissions to atmosphere may be reduced or avoided.

The technical effect of switching a purging path from a single path to a dual-path in response to a vapor slug event inferred during a canister purging operation is to distribute in time the fuel vapors being routed to the engine. Specifically, distributing the fuel vapors in time may be understood to be due to the time delay between fuel vapors exiting the canister and reaching engine intake being greater for the boost path and lesser for the vacuum path. Thus, by distributing in time the fuel vapors, an effective amount of fuel vapors reaching the engine intake at any one time may be reduced upon switching purging from a single path to the dual-path, which may have the effect of avoiding issues pertaining to engine hesitation and/or stall.

Figure 3:
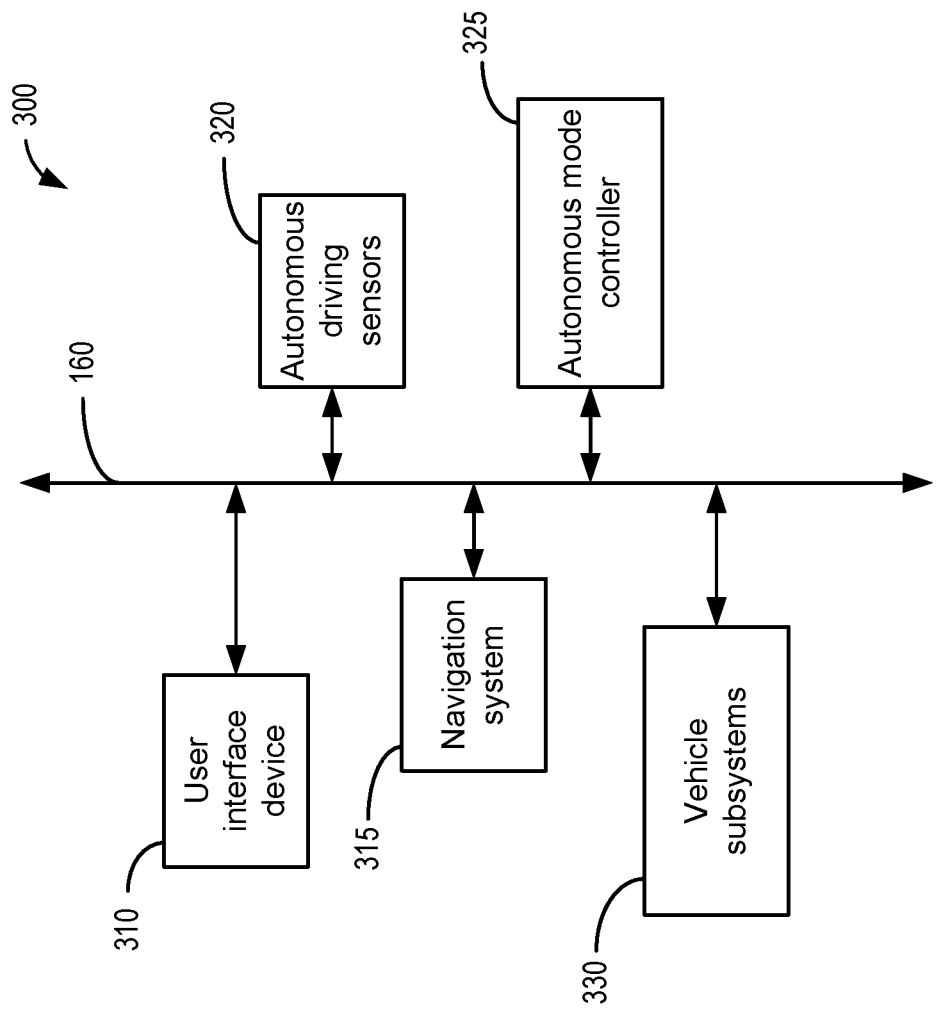
FIG. 3 schematically illustrates a block diagram of an example system for an autonomous vehicle.

The systems discussed herein and with regard to FIGS. 1-3, along with the methods discussed herein and with regard to FIG. 5 and FIG. 8, may enable one or more systems and one or more methods. In one example, a method comprises purging fuel vapors from a fuel vapor storage canister to an engine of a vehicle via a single path; and in response to an inferred increase in a concentration of the fuel vapors being purged to the engine via the single path, switching to purging the fuel vapors to the engine via two paths including the single path, simultaneously. In a first example of the method, the method further includes wherein a time frame between the fuel vapors exiting the fuel vapor storage canister and entering the engine is different for each of the two paths. A second example of the method optionally includes the first example, and further includes wherein the single path is one of a vacuum path where the fuel vapors are routed to the engine without passing through an intake throttle or a boost path where the fuel vapors are routed to the engine through the intake throttle; and wherein the two paths include both the vacuum path and the boost path. A third example of the method optionally includes any one or more or each of the first through second examples, and further includes wherein switching to purging the fuel vapors to the engine via the two paths simultaneously further comprises: adjusting one or more of an engine intake manifold vacuum and a throttle inlet pressure based on how much the engine intake manifold vacuum and/or throttle inlet pressure have to be increased or decreased by to switch the fuel vapors to be purged via the two paths simultaneously. A fourth example of the method optionally includes any one or more or each of the first through third examples, and further includes where switching to purging the fuel vapors to the engine via the two paths simultaneously occurs without changing vehicle speed by more than a threshold speed change. A fifth example of the method optionally includes any one or more or each of the first through fourth examples, and further includes wherein the vehicle is an autonomous vehicle and where switching to purging the fuel vapors to the engine via the two paths simultaneously includes accelerating or decelerating the vehicle. A sixth example of the method optionally includes any one or more or each of the first through fifth examples, and further comprises indicating that the fuel vapors cannot be switched to being purged to the engine via the two paths simultaneously based on operating conditions of the engine; and responsive to an indication that the fuel vapors cannot be switched to being purged to the engine via the two paths simultaneously, discontinuing purging the fuel vapors to the engine. A seventh example of the method optionally includes any one or more or each of the first through sixth examples, and further includes wherein the inferred increase in the concentration of the fuel vapors includes a greater than threshold pressure increase in a fuel tank of the vehicle, or vehicle acceleration or deceleration that is independent of a position of an accelerator pedal. An eighth example of the method optionally includes any one or more or each of the first through seventh examples, and further comprises controlling a duty cycle of a canister purge valve that regulates a flow rate of the fuel vapors being purged to the engine while the fuel vapors are being purged to the engine via the single path and via the two paths.

Another example of a method comprises purging fuel vapors from a fuel vapor storage canister to an intake of an engine via one of a vacuum path or a boost path; and in response to an indication of imminent engine hesitation or stall, purging the fuel vapors from the fuel vapor storage canister to the engine via both the vacuum path and the boost path. In a first example of the method, the method further includes wherein purging the fuel vapors via the boost path includes routing the fuel vapors through an ejector system to an air intake system at a position upstream of a compressor and then to the engine; and wherein purging the fuel vapors via the vacuum path includes routing the fuel vapors to the engine without the fuel vapors being routed through the ejector system to the air intake system at the position upstream of the compressor. A second example of the method optionally includes the first example, and further comprises indicating imminent engine hesitation and/or stall responsive to one or more of a fuel tank pressure increase greater than a threshold increase and an acceleration or deceleration of the vehicle that is not related to a change in position of an accelerator pedal. A third example of the method optionally includes any one or more or each of the first through second examples, and further includes wherein purging the fuel vapors via both the vacuum path and the boost path includes adjusting one or more of an engine intake manifold vacuum and a throttle inlet pressure. A fourth example of the method optionally includes any one or more or each of the first through third examples, and further includes wherein adjusting one or more of the engine intake manifold vacuum and the throttle inlet pressure further includes decreasing the engine intake manifold vacuum and/or increasing the throttle inlet pressure when the purging the fuel vapors is via the vacuum path and not the boost path in order to purge the fuel vapors via both the vacuum path and the boost path; and increasing the engine intake manifold vacuum and/or decreasing the throttle inlet pressure when the purging the fuel vapors is via the boost path and not the vacuum path in order to purge the fuel vapors via both the vacuum path and the boost path. A fifth example of the method optionally includes any one or more or each of the first through fourth examples, and further includes wherein adjusting one or more of the engine intake manifold vacuum and the throttle inlet pressure further comprises one or more of adjusting twin independent variable cam timing of the engine, changing a gear of a transmission of the vehicle, controlling a duty cycle of a compressor bypass valve, controlling a position of an intake throttle, and controlling a duty cycle of a turbine wastegate valve. A sixth example of the method optionally includes any one or more or each of the first through fifth examples, and further includes wherein a time duration between the fuel vapors exiting the fuel vapor storage canister and entering the engine is longer along the boost path than the vacuum path; and wherein purging the fuel vapors from the fuel vapor storage canister via both the vacuum path and the boost path distributes the fuel vapors in time so that an effective concentration of fuel vapors reaching the engine at a particular time since the fuel vapors exit the fuel vapor storage canister, is reduced.

An example of a system for a vehicle comprises an engine; a compressor coupled to an engine intake for providing a boosted aircharge to the engine; a fuel vapor storage canister positioned in an evaporative emissions system; a dual-path purge system that includes a vacuum path and a boost path for purging fuel vapors from the fuel vapor storage canister to the engine, the vacuum path including a conduit that couples the fuel vapor storage canister to the engine intake downstream of the compressor and the boost path including an ejector system that couples the fuel vapor storage canister to an air intake system at a position upstream of the compressor; and a controller with computer readable instructions stored in non-transitory memory that when executed cause the controller to: purge the fuel vapor storage canister to the engine via one of the vacuum path and the boost path, and responsive to a vapor slug event where a concentration of fuel vapors being purged to the engine increases, adjusting one or more of a vacuum level in an intake manifold of the engine and a boost pressure provided by the compressor to purge the fuel vapors to the engine intake along both the vacuum path and the boost path simultaneously. In a first example of the system, the system further comprises a fuel tank fluidically coupled to the fuel vapor storage canister and a fuel tank pressure transducer for monitoring fuel tank pressure; and wherein the controller stores further instructions for inferring the vapor slug event based on a greater than threshold fuel tank pressure increase while the fuel vapor storage canister is being purged via the vacuum path or the boost path. A second example of the system optionally includes the first example, and further comprises a transmission and a twin independent variable cam timing system for the engine; and wherein the controller stores further instructions to adjust a gearing of the transmission and/or control the twin independent variable cam timing system to adjust one or more of the vacuum level in the intake manifold of the engine and the boost pressure to switch the fuel vapors to be purged to engine intake along both the vacuum path and the boost path simultaneously. A third example of the system optionally includes any one or more or each of the first through second examples, and further comprises one or more sensors coupled to a navigation system and an intake throttle that is electronically actuatable; an exhaust turbine that couples to the compressor; a compressor bypass valve positioned in a compressor bypass conduit; a wastegate valve positioned in a wastegate conduit for bypassing a turbine; and wherein the controller stores further instructions to: determine a target vehicle speed where the vacuum level in the intake manifold and the boost pressure enable fuel vapors to be simultaneously purged along both the vacuum path and the boost path; retrieve navigation information from the navigation sensors; and adjust a position of one or more of the intake throttle, the compressor bypass valve and the wastegate valve to control a speed of the vehicle to the target speed based on the navigation information retrieved from the navigation sensors.

In another representation, a method comprises purging a fuel vapor canister via a vacuum path and a boost path simultaneously to learn a loading state of a fuel vapor storage canister positioned in an evaporative emissions system of a vehicle. Such purging may be in response to a vehicle-on event following a refueling event or a vehicle soak event where canister loading state is inferred to increase to an unknown level.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   purging fuel vapors from a fuel vapor storage canister to an engine of a vehicle via a single path; and
   in response to an inferred increase in a concentration of the fuel vapors being purged to the engine via the single path, switching to purging the fuel vapors to the engine via two paths including the single path, simultaneously.

2. The method of claim 1, wherein a time frame between the fuel vapors exiting the fuel vapor storage canister and entering the engine is different for each of the two paths.

3. The method of claim 1, wherein the single path is one of a vacuum path where the fuel vapors are routed to the engine without passing through an intake throttle or a boost path where the fuel vapors are routed to the engine through the intake throttle; and
   wherein the two paths include both the vacuum path and the boost path.

4. The method of claim 1, wherein switching to purging the fuel vapors to the engine via the two paths simultaneously further comprises:
   adjusting one or more of an engine intake manifold vacuum and a throttle inlet pressure based on how much the engine intake manifold vacuum and/or throttle inlet pressure have to be increased or decreased by to switch the fuel vapors to be purged via the two paths simultaneously.

5. The method of claim 1, where switching to purging the fuel vapors to the engine via the two paths simultaneously occurs without changing vehicle speed by more than a threshold speed change.

6. The method of claim 1, wherein the vehicle is an autonomous vehicle and where switching to purging the fuel vapors to the engine via the two paths simultaneously includes accelerating or decelerating the vehicle.

7. The method of claim 1, further comprising indicating that the fuel vapors cannot be switched to being purged to the engine via the two paths simultaneously based on operating conditions of the engine; and
   responsive to an indication that the fuel vapors cannot be switched to being purged to the engine via the two paths simultaneously, discontinuing purging the fuel vapors to the engine.

8. The method of claim 1, wherein the inferred increase in the concentration of the fuel vapors includes a greater than threshold pressure increase in a fuel tank of the vehicle, or vehicle acceleration or deceleration that is independent of a position of an accelerator pedal.

9. The method of claim 1, further comprising controlling a duty cycle of a canister purge valve that regulates a flow rate of the fuel vapors being purged to the engine while the fuel vapors are being purged to the engine via the single path and via the two paths.

10. A method comprising:
purging fuel vapors from a fuel vapor storage canister to an intake of an engine via one of a vacuum path or a boost path; and
in response to an indication of imminent engine hesitation or stall, purging the fuel vapors from the fuel vapor storage canister to the engine via both the vacuum path and the boost path.

11. The method of claim 10, wherein purging the fuel vapors via the boost path includes routing the fuel vapors through an ejector system to an air intake system at a position upstream of a compressor and then to the engine; and
wherein purging the fuel vapors via the vacuum path includes routing the fuel vapors to the engine without the fuel vapors being routed through the ejector system to the air intake system at the position upstream of the compressor.

12. The method of claim 10, further comprising indicating imminent engine hesitation and/or stall responsive to one or more of a fuel tank pressure increase greater than a threshold increase and an acceleration or deceleration of the vehicle that is not related to a change in position of an accelerator pedal.

13. The method of claim 10, wherein purging the fuel vapors via both the vacuum path and the boost path includes adjusting one or more of an engine intake manifold vacuum and a throttle inlet pressure.

14. The method of claim 13, wherein adjusting one or more of the engine intake manifold vacuum and the throttle inlet pressure further includes decreasing the engine intake manifold vacuum and/or increasing the throttle inlet pressure when the purging the fuel vapors is via the vacuum path and not the boost path in order to purge the fuel vapors via both the vacuum path and the boost path; and
increasing the engine intake manifold vacuum and/or decreasing the throttle inlet pressure when the purging the fuel vapors is via the boost path and not the vacuum path in order to purge the fuel vapors via both the vacuum path and the boost path.

15. The method of claim 13, wherein adjusting one or more of the engine intake manifold vacuum and the throttle inlet pressure further comprises one or more of adjusting twin independent variable cam timing of the engine, changing a gear of a transmission of the vehicle, controlling a duty cycle of a compressor bypass valve, controlling a position of an intake throttle, and controlling a duty cycle of a turbine wastegate valve.

16. The method of claim 10, wherein a time duration between the fuel vapors exiting the fuel vapor storage canister and entering the engine is longer along the boost path than the vacuum path; and
wherein purging the fuel vapors from the fuel vapor storage canister via both the vacuum path and the boost path distributes the fuel vapors in time so that an effective concentration of fuel vapors reaching the engine at a particular time since the fuel vapors exit the fuel vapor storage canister, is reduced.

17. A system for a vehicle, comprising:
an engine;
a compressor coupled to an engine intake for providing a boosted aircharge to the engine;
a fuel vapor storage canister positioned in an evaporative emissions system;
a dual-path purge system that includes a vacuum path and a boost path for purging fuel vapors from the fuel vapor storage canister to the engine, the vacuum path including a conduit that couples the fuel vapor storage canister to the engine intake downstream of the compressor and the boost path including an ejector system that couples the fuel vapor storage canister to an air intake system at a position upstream of the compressor; and
a controller with computer readable instructions stored in non-transitory memory that when executed cause the controller to:
purge the fuel vapor storage canister to the engine via one of the vacuum path and the boost path, and responsive to a vapor slug event where a concentration of fuel vapors being purged to the engine increases, adjusting one or more of a vacuum level in an intake manifold of the engine and a boost pressure provided by the compressor to purge the fuel vapors to the engine intake along both the vacuum path and the boost path simultaneously.

18. The system of claim 17, further comprising a fuel tank fluidically coupled to the fuel vapor storage canister and a fuel tank pressure transducer for monitoring fuel tank pressure; and
wherein the controller stores further instructions for inferring the vapor slug event based on a greater than threshold fuel tank pressure increase while the fuel vapor storage canister is being purged via the vacuum path or the boost path.

19. The system of claim 17, further comprising a transmission and a twin independent variable cam timing system for the engine; and
wherein the controller stores further instructions to adjust a gearing of the transmission and/or control the twin independent variable cam timing system to adjust one or more of the vacuum level in the intake manifold of the engine and the boost pressure to switch the fuel vapors to be purged to engine intake along both the vacuum path and the boost path simultaneously.

20. The system of claim 17, further comprising:
one or more sensors coupled to a navigation system and an intake throttle that is electronically actuatable;
an exhaust turbine that couples to the compressor;
a compressor bypass valve positioned in a compressor bypass conduit;
a wastegate valve positioned in a wastegate conduit for bypassing a turbine; and
wherein the controller stores further instructions to:
determine a target vehicle speed where the vacuum level in the intake manifold and the boost pressure enable fuel vapors to be simultaneously purged along both the vacuum path and the boost path;
retrieve navigation information from the navigation sensors; and
adjust a position of one or more of the intake throttle, the compressor bypass valve and the wastegate valve to control a speed of the vehicle to the target speed based on the navigation information retrieved from the navigation sensors.

* * * * *